United States Patent
Nakayama et al.

(10) Patent No.: US 10,720,820 B2
(45) Date of Patent: Jul. 21, 2020

(54) ROTATING ELECTRIC MACHINE AND METHOD FOR MANUFACTURING THE ROTATING ELECTRIC MACHINE

(71) Applicant: Hitachi Automotive Systems, Ltd., Hitachinaka-shi, Ibaraki (JP)

(72) Inventors: Kenichi Nakayama, Hitachinaka (JP); Yoshimi Mori, Hitachinaka (JP); Takahiro Omori, Hitachinaka (JP); Tomoaki Kaimori, Hitachinaka (JP); Tsuyoshi Gotou, Hitachinaka (JP); Hiromitsu Okamoto, Hitachinaka (JP); Naoki Nishikawa, Hitachinaka (JP); Takashi Genmoto, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 16/263,647

(22) Filed: Jan. 31, 2019

(65) Prior Publication Data
US 2019/0165660 A1    May 30, 2019

Related U.S. Application Data

(63) Continuation of application No. 15/423,831, filed on Feb. 3, 2017, now Pat. No. 10,236,757, which is a (Continued)

(30) Foreign Application Priority Data

Sep. 22, 2011    (JP) .................................. 2011-207403

(51) Int. Cl.
*H02K 11/00* (2016.01)
*H02K 21/14* (2006.01)
(Continued)

(52) U.S. Cl.
CPC ................ *H02K 21/14* (2013.01); *H02K 1/16* (2013.01); *H02K 1/185* (2013.01); *H02K 1/187* (2013.01);
(Continued)

(58) Field of Classification Search
CPC .. H02K 15/0435; H02K 3/12; H02K 15/0081; H02K 3/28; H02K 2203/09;
(Continued)

(56) References Cited

U.S. PATENT DOCUMENTS 6,469,413 B1 * 10/2002 Oohashi ................. H02K 11/05
310/184
8,264,115 B2 * 9/2012 Nakamura ............... H02K 3/12
310/184
(Continued)

FOREIGN PATENT DOCUMENTS

JP    2005-253145 A    9/2005
JP    2006-33964 A    2/2006
(Continued)

OTHER PUBLICATIONS

International Search Report (PCT/ISA/210) with English translation dated Nov. 13, 2012 (Five (5) pages).

*Primary Examiner* — Thanh Lam
(74) *Attorney, Agent, or Firm* — Crowell & Moring LLP

(57) ABSTRACT

A rotating electric machine includes: a stator core having a plurality of slots aligned along a circumferential direction; a stator having a stator coil with an enamel coating inserted into the slots of the stator core; and a rotor rotatably arranged over the stator core through a given gap. The stator coil includes: main coils of a plurality of phases in which a plurality of segment coils each having a rectangular cross-section wire formed into a substantially U-shaped wire in advance is connected to each other; a first sub-coil having a
(Continued)

lead wire led from the slots and attached with an AC terminal, and connected to one end of the respective main coils; and a second sub-coil having a neutral wire led from the slots, and connected to the other end of the respective main coils. The lead wire and the neutral wire are each formed of a wire with a bend structure having a plurality of straights and bends.

8 Claims, 20 Drawing Sheets

Related U.S. Application Data continuation of application No. 14/239,729, filed as application No. PCT/JP2012/070247 on Aug. 8, 2012, now Pat. No. 9,601,977.

(51) Int. Cl.
    *H02K 3/12*     (2006.01)
    *H02K 15/00*     (2006.01)
    *H02K 3/28*     (2006.01)
    *H02K 15/04*     (2006.01)
    *H02K 1/16*     (2006.01)
    *H02K 1/18*     (2006.01)

(52) U.S. Cl.
    CPC ............... *H02K 3/12* (2013.01); *H02K 3/28* (2013.01); *H02K 15/0081* (2013.01); *H02K 15/0421* (2013.01); *H02K 15/0435* (2013.01); *Y10T 29/49009* (2015.01)

(58) Field of Classification Search
    CPC ...... H02K 3/50; H02K 5/225; H02K 2203/06; H02K 3/38
    USPC .................................. 310/71, 206, 207, 208
    See application file for complete search history.

(56) References Cited

U.S. PATENT DOCUMENTS

| | | | |
|---|---|---|---|
| 8,686,610 | B2 | 4/2014 | Okamoto et al. |
| 10,236,757 | B2 * | 3/2019 | Nakayama ......... H02K 15/0435 |
| 2003/0218394 | A1 | 11/2003 | Hashiba et al. |
| 2004/0108784 | A1 | 6/2004 | Higashino et al. |
| 2005/0194857 | A1 | 9/2005 | Mori et al. |
| 2008/0224561 | A1 | 9/2008 | Takeuchi |
| 2009/0276997 | A1 | 11/2009 | Akimoto et al. |
| 2010/0060090 | A1 | 3/2010 | Sakata |
| 2010/0060100 | A1 | 3/2010 | Urano et al. |
| 2010/0207466 | A1 | 8/2010 | Endo et al. |
| 2010/0270094 | A1 | 10/2010 | Nakayama et al. |
| 2011/0001373 | A1 | 1/2011 | Mori et al. |
| 2011/0025164 | A1 | 2/2011 | Tanaka et al. |
| 2011/0133593 | A1* | 6/2011 | Nakamura ............... H02K 3/12 |
| | | | 310/201 |
| 2012/0019081 | A1 | 1/2012 | Tamura et al. |

FOREIGN PATENT DOCUMENTS

| | | |
|---|---|---|
| JP | 2008-92788 A | 4/2008 |
| JP | 2009-5538 A | 1/2009 |
| JP | 2009-106003 A | 5/2009 |
| JP | 2009-131103 A | 6/2009 |
| JP | 2009-278708 A | 11/2009 |
| JP | 2010-141967 A | 6/2010 |
| JP | 2011-15459 A | 1/2011 |
| JP | 2011-62040 A | 3/2011 |
| JP | 2011-151955 A | 8/2011 |
| JP | 2011-182561 A | 9/2011 |

* cited by examiner

ROTATING ELECTRIC MACHINE AND METHOD FOR MANUFACTURING THE ROTATING ELECTRIC MACHINE

CROSS REFERENCE TO RELATED APPLICATIONS

This application is a continuation of U.S. patent application Ser. No. 15/423,831, filed Feb. 3, 2017, the entire disclosure of which is expressly incorporated herein by reference, which is a continuation of U.S. patent application Ser. No. 14/239,729, filed Jun. 10, 2014, now U.S. Pat. No. 9,601,977, issued Mar. 21, 2017, the entire disclosure of which is expressly incorporated herein by reference, which is the U.S. national stage of International Patent application no. PCT/JP2012/070247, filed Aug. 8, 2012, designating the United States of America, the entire disclosure of which is expressly incorporated herein by reference. Priority is claimed based on Japanese Patent application no. 2011-207403, filed Sep. 22, 2011, the entire disclosure of which is also expressly incorporated by reference herein.

TECHNICAL FIELD

The present invention relates to a rotating electric machine, and a method for manufacturing the rotating electric machine.

BACKGROUND ART

In the rotating electric machine, an AC power is supplied to a stator coil to generate a rotating magnetic field, and a rotor is rotated by the rotating magnetic field. Also, a mechanical energy applied to the rotor can be converted into an electric energy to output the AC power from the coil. In this way, the rotating electric machine operates as an electric motor or an electric generator. As a stator of the rotating electric machine of this type, there has been known a configuration in which an external connection side lead wire is arranged on an upper portion of a stator core so as to extend in an axial direction, and a neutral wire is arranged on each end of the external connection side lead wire (for example, refer to Patent Literature 1).

CITATION LIST

Patent Literature

Patent Literature 1: Japanese Laid-Open Patent Application No. 2011-015459

SUMMARY OF INVENTION

Technical Problem

When the rotating electric machine of this type is mounted in a vehicle, the rotating electric machine is downsized to be downsized because the rotating electric machine is attached to a limited small space. In order to ensure a gap between an upper portion of a coil end and an emission portion, it is desirable to narrow a convex area where the neutral wire is routed. However, the rotating electric machine of this type suffers from such a problem that a core back or the coil end becomes large, and is protruded in an axial direction or a radial direction.

Solution to Problem

According to one embodiment of the present invention, there is provided a rotating electric machine including: a stator core having a plurality of slots aligned along a circumferential direction; a stator having a stator coil with an insulation coat inserted into the slots of the stator core; and a rotor rotatably arranged over the stator core through a given gap, in which the stator coil includes: main coils of a plurality of phases in which a plurality of segment coils each of them are formed from rectangular cross-section wire into substantially U-shape in advance is connected to each other; a first sub-coil having a lead wire led from the slots and attached with an AC terminal, and connected to one end of the respective main coils; and a second sub-coil having a neutral wire led from the slots, and connected to the other end of the respective main coils, and in which the lead wire and the neutral wire are each formed of a wire with a bend structure having a plurality of straights and bends.

According to another embodiment of the present invention, there is provided a method for manufacturing the rotating electric machine according to the above embodiment, in which a forming process of bending a wire while abutting a molding pin against the wire is sequentially conducted a plurality of times to form a plurality of bends.

Advantageous Effects of Invention

According to the present invention, the core back and the coil end can be downsized.

DESCRIPTION OF EMBODIMENTS

Hereinafter, embodiments of the present invention will be described with reference to the drawings.

First Embodiment (Overall Configuration of Rotating Electric Machine)

A rotating electric machine according to this embodiment is a rotating electric machine suitably used for travel of the vehicle. In this example, as so-called electric vehicle using the rotating electric machine includes, hybrid electric vehicle (HEV) having both of an engine and the rotating electric machine, and a pure electric vehicle (EV) that travels only by the aid of the rotating electric machine without using the engine. However, the rotating electric machine described below can be used for both of those types, and therefore a description will be typically given of the rotating electric machine used for the vehicle of the hybrid type.

Figure 1:
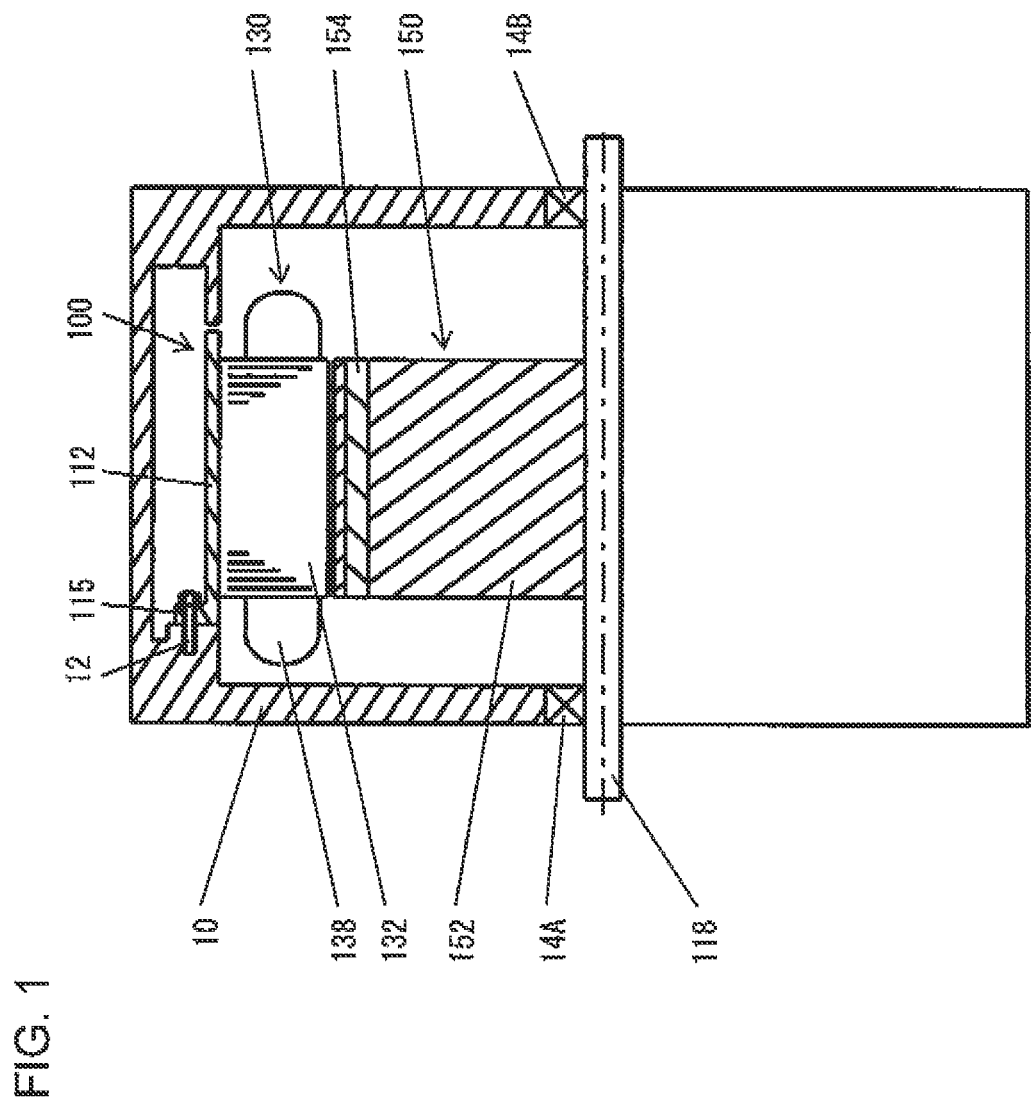
FIG. 1 is a schematic diagram illustrating an overall configuration of a rotating electric machine according to a first embodiment of the present invention.

FIG. 1 is a schematic diagram illustrating an overall configuration of a rotating electric machine 100 according to a first embodiment of the present invention. FIG. 1 illustrates an interior of the rotating electric machine 100 with a partial cross-section of the rotating electric machine 100. As illustrated in FIG. 1, the rotating electric machine 100 is arranged within a case 10, and includes a housing 112, a stator 130 having a stator core 132 fixed to the housing 112, and a rotor 150 rotatably arranged within the stator. The case 10 is configured by an engine case or a transmission case.

The rotating electric machine 100 is a three-phase synchronous motor with an interior permanent magnet. The rotating electric machine 100 operates as an electric motor that rotates the rotor 150 with the supply of a three-phase AC current to the stator coil 138 winded on the stator core 132. Also, when the rotating electric machine 100 is driven by the engine, the rotating electric machine 100 operates as a power generator, and outputs a generated power of three-phase AC. That is, the rotating electric machine 100 has both of a function as the electric generator that generates a rotating torque on the basis of an electric energy, and a function as an electric generator that generates an electric power on the basis of a mechanical energy, and can selectively use the above functions according to a travel state of the vehicle.

The stator 130 is fixed to the housing 112. The stator 130 is fixedly held within the case 10 by fastening a flange 115 disposed on the housing 112 to the case 10 with a bolt 12. The rotor 150 fixed to a shaft 118 is supported by bearings 14A and 14B assembled with the case 10, and rotatably held within the stator core 132.

Figure 2:
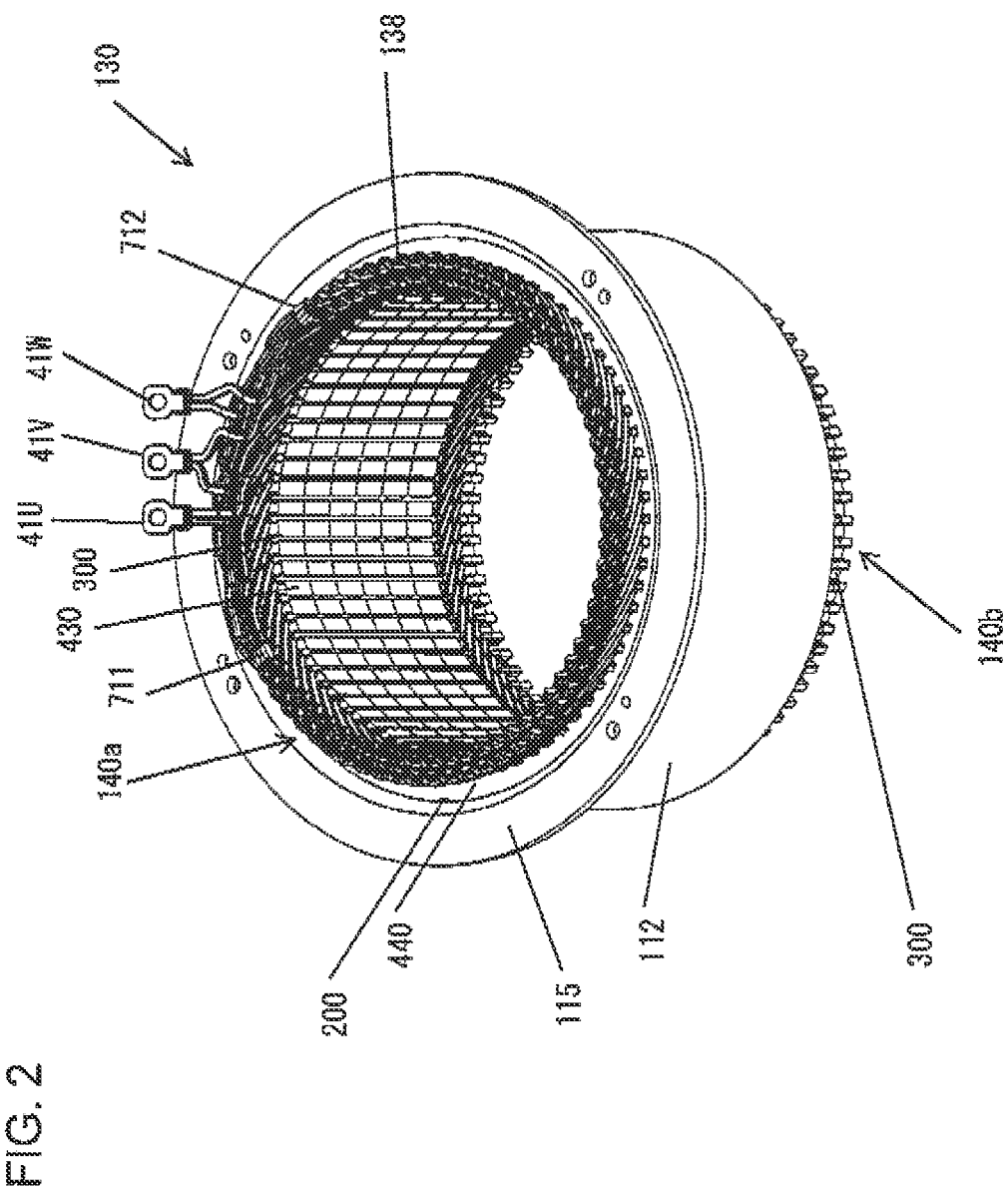
FIG. 2 is a perspective view illustrating a stator of the rotating electric machine according to the first embodiment of the present invention.

FIG. 2 is a perspective view illustrating the stator 130 fitted to the housing 112. The housing 112 is formed into a cylindrical shape by drawing a steel plate (high tension steel or the like) of about 2 to 5 mm thickness. An end of the housing 112 in an axial direction thereof is equipped with a flange 115, and fixed to the case 10 with the bolt as described above (refer to FIG. 1). The flange 115 is integrally formed with the housing 112 by drawing. The stator 130 may be fixed directly to the case 10 without the provision of the housing 112.

Figure 3:
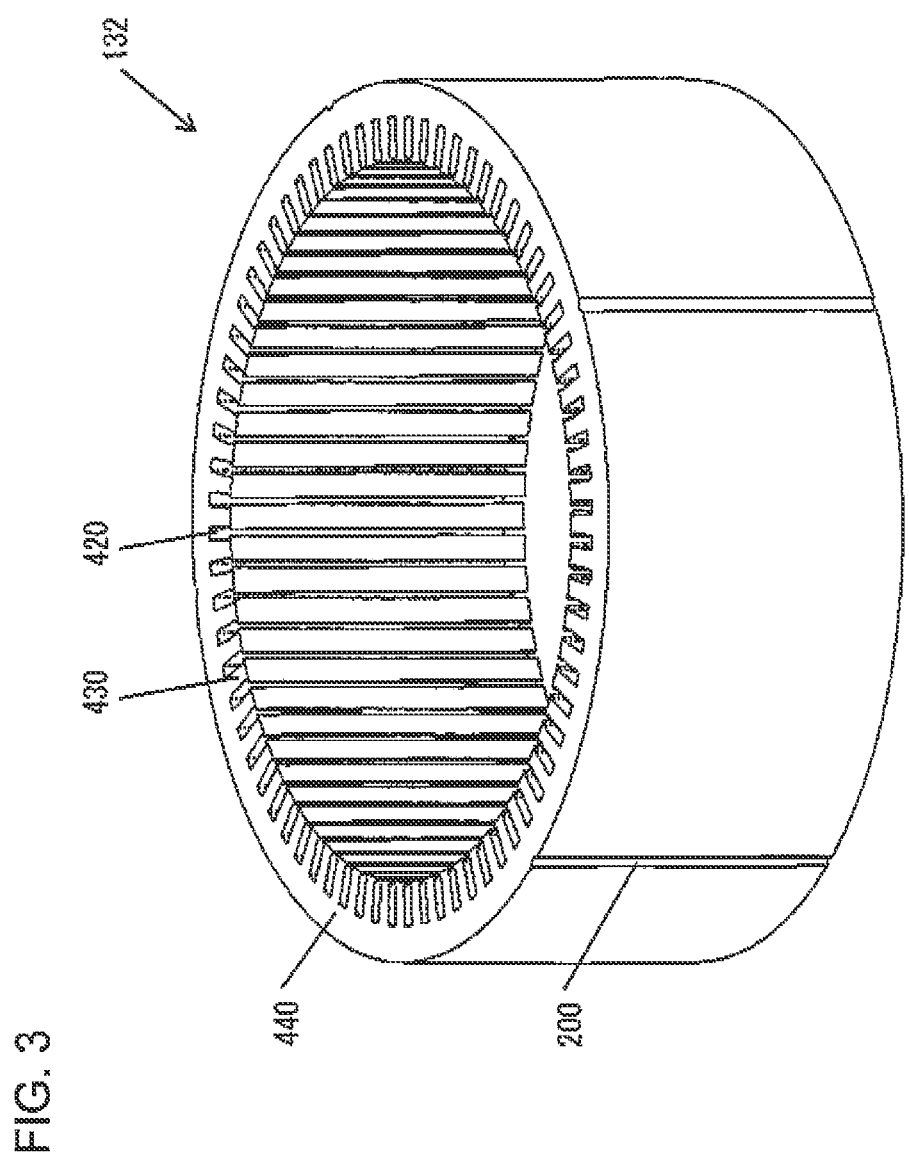
FIG. 3 is a perspective view of a stator core 132.
Figure 4:
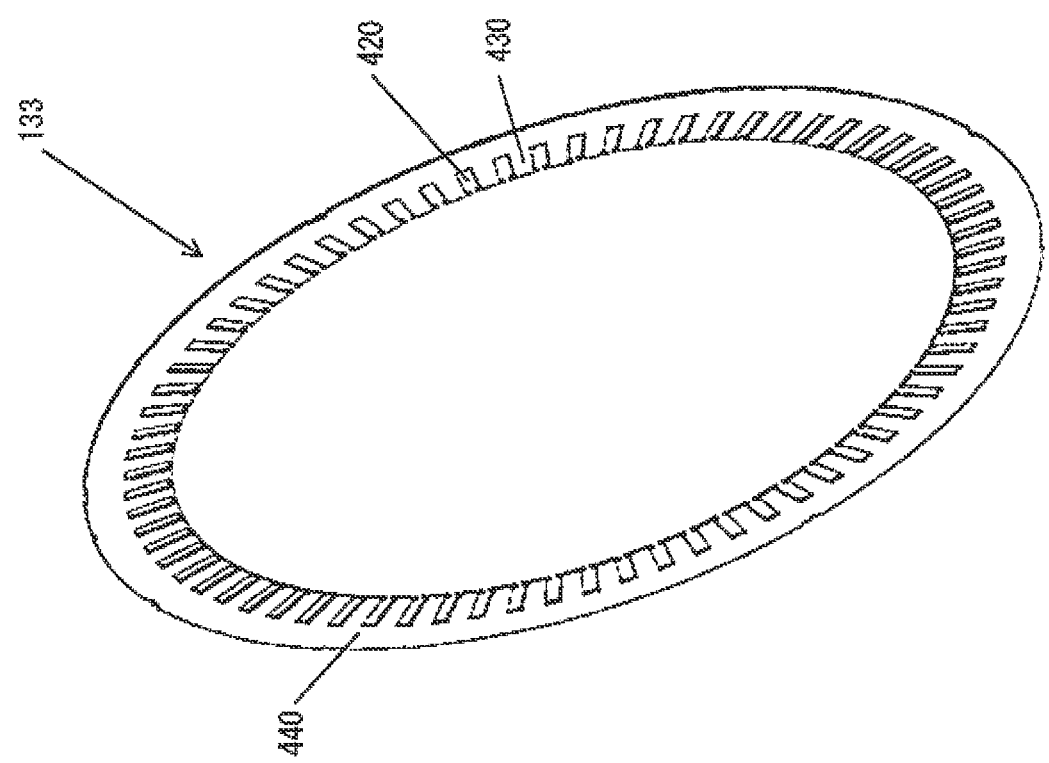
FIG. 4 is a diagram illustrating a magnetic steel sheet 133.

The stator 130 is fixed to an inner peripheral side of the housing 112, and includes a cylindrical stator core 132, and a stator coil 138 equipped in the stator core 132. FIG. 3 is a perspective view of the stator core 132. The stator core 132 is formed by stacking a plurality of magnetic steel sheets 133 as illustrated in FIG. 4 on each other. The magnetic steel sheet 133 is about 0.05 to 1.0 mm in thickness, and shaped by punching or etching. The stacked magnetic steel sheets 133 are fixed by welding. In an example illustrated in FIG. 3, welded portions 200 indicate the welding portion. With such welding, the respective stacked magnetic steel sheets 133 are connected to each other, and the deformation of the magnetic steel sheets 133 caused by a tightening force in press fitting the magnetic steel sheets 133 into the housing 112 is suppressed.

A plurality of slots 420 extending in the axial direction is formed in the stator core 132 at regular intervals in the circumferential direction of the stator core 132. The number of slots 420 is, for example, 72 in this embodiment. The stator coil 138 is housed in the slots 420 as illustrated in FIG. 2. In the example illustrated in FIG. 3, the slots 420 are open slots, and opening is formed in an inner peripheral side of the stator core. A width of the opening in the circumferential direction is substantially equal to or slightly smaller than coil loaded portions of the respective slots 420 in which the stator coil 138 is loaded.

An insulating paper 300 is arranged within the respective slots 420. The insulating paper 300 is arranged in each of the slots 420, and coil ends 140a, 140b. The insulating paper 300 (so-called slot liner) arranged in the slots 420 is arranged between the coils inserted into the slots 420 and between the coil and an inner surface of the slot 420. With this configuration, a withstand voltage between the coils and between the coil and the inner surface of the slots 420 is improved.

Also, the insulating paper 300 arranged on the coil ends 140a and 140b is annularly arranged between the coils for phase to phase insulation, or wire to wire insulation at the coil ends 140a and 140b. In this way, the rotating electric machine 100 according to this embodiment can hold a necessary withstand voltage even if an insulation coat of the coil is damaged or deteriorated, because the insulating paper 300 is arranged on an inside of the slots 420 or the coil ends 140a, 140b. The insulating paper 300 is, for example, an insulating sheet of a heat-resistant polyamide paper, and about 0.1 to 0.5 mm in thickness.

Teeth 430 are formed between the slots 420, and the respective teeth 430 are integrated with an annular core back 440. The stator core 132 is formed of an integral core in which the respective teeth 430 and the core back 440 are integrally molded. The teeth 430 operates to guide a rotating magnetic field generated by the stator coil 138 to the rotor 150, and allow the rotor 150 to generate a rotating torque.

The stator core 132 illustrated in FIG. 3 is fixedly fitted to the inside of the above-mentioned cylindrical housing 112 by shrink fitting. As a specific assembling manner, for example, the stator core 132 is firstly arranged, and the stator core 132 is fitted into the housing 112 that has been heated and widened the inner diameter by thermal expansion in advance. Subsequently, the housing 112 is cooled to shrink the inner diameter, to thereby tighten an outer peripheral portion of the stator core 132 by heat shrink.

The inner diameter of the housing 112 is set to be smaller than the outer diameter of the stator core 132 by a given value so that the stator core 132 does not run idle relative to the housing 112 due to a reaction caused by a torque of the rotor 150 during operation. As a result, the stator core 132 is rigidly fixed to the inside of the housing 112 by shrink fit. The difference between the outer diameter of the stator core 132 and the inner diameter of the housing 112 at room temperature is called "fitting margin". The fitting margin is set assuming a maximum torque of the rotating electric machine 100 whereby the housing 112 can hold the stator core 132 by a given tightening force. The stator core 132 is not only fixedly fitted by shrink fitting, but also may be fixedly fitted into the housing 112 press fitting.

Figure 5:
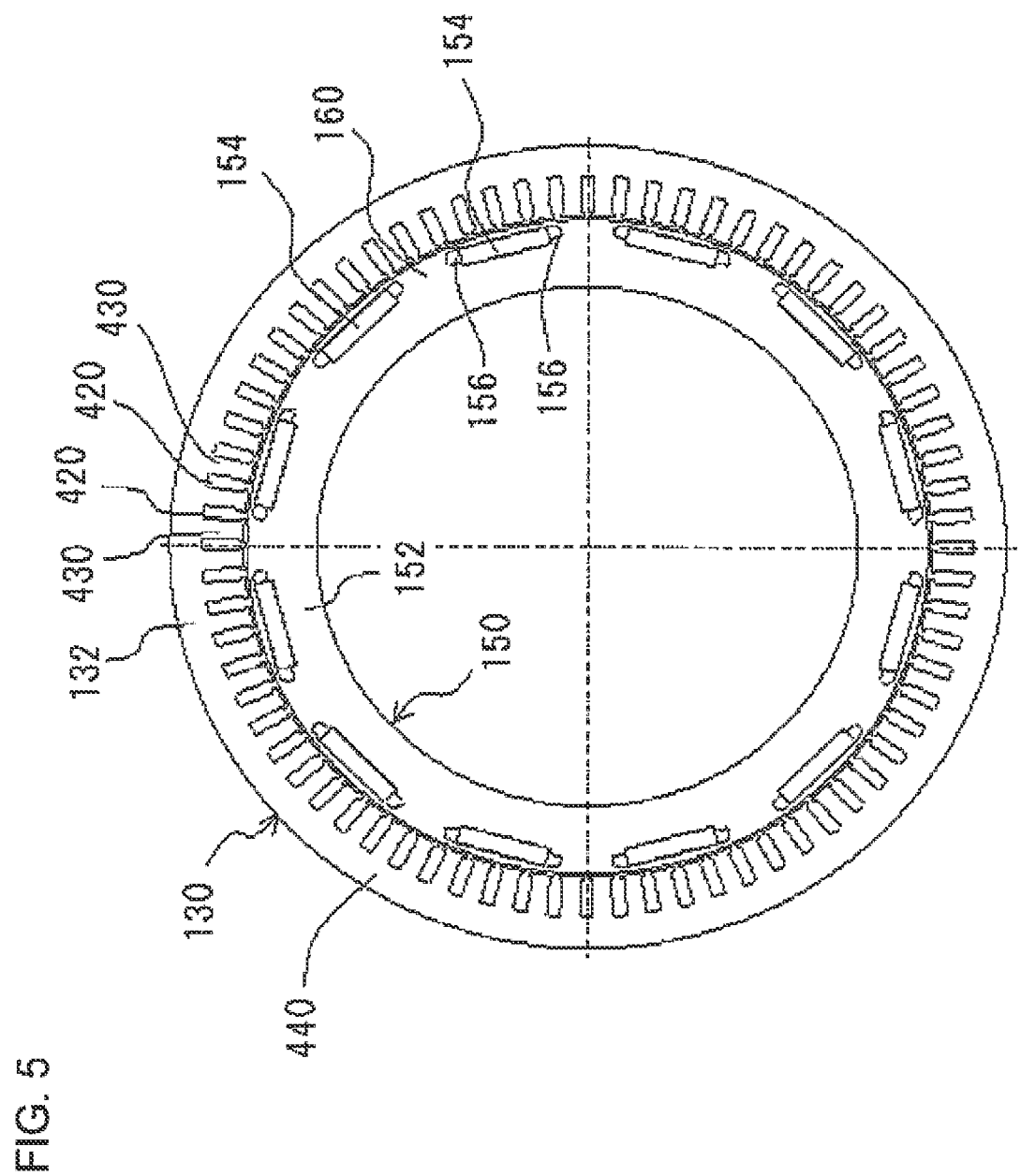
FIG. 5 is a diagram illustrating a cross-section of a rotor 150 and a stator 130.

FIG. 5 is a diagram illustrating the rotor 150, which is a diagram illustrating a cross-section of the rotor 150 and the stator 130. In order to avoid complication, the stator coil 138 and the insulating paper 300 stored within the shaft 118 and the slots 420 are omitted. As illustrated in FIG. 5, the rotor 150 includes a rotor core 152, and permanent magnets 154 held in magnet slots formed in the rotor core 152.

The magnet slots each having a cubic shape are formed in the rotor core 152 at regular intervals in the circumferential direction in the vicinity of the outer peripheral portion. The permanent magnets 154 are embedded in the respective magnet slots, and fixed thereto by adhesive or the like. A width of the magnet slots in the circumferential direction is formed to be larger than a width of the permanent magnets 154 in the circumferential direction, and magnetic gaps 156 are formed on both sides of the permanent magnets 154. The magnetic gaps 156 may be embedded with adhesive, or resin may be solidified integrally with the permanent magnets 154.

The permanent magnets 154 form a field pole of the rotor 150. In this embodiment, one permanent magnet 154 is configured to form one magnetic pole. Alternatively, one magnetic pole may be configured by a plurality of permanent magnets. The permanent magnet for forming each magnetic pole is increased in multiple with the results that a magnetic flux density of the respective magnetic poles generated by the permanent magnets is increased so that a magnet torque can be increased.

A magnetization direction of the permanent magnets 154 is oriented along a radial direction, and an orientation of the magnetization direction is reversed for each of the field poles. That is, when it is assumed that one surface of the permanent magnet 154 for forming one magnetic pole on a stator side is magnetized to the N pole, and another surface thereof on a shaft side is magnetized to the S pole, one surface of the permanent magnet 154 for forming an adjacent magnetic pole on the stator side is magnetized to the S pole, and another surface thereof on the shaft side is magnetized to the N pole. In this embodiment, twelve permanent magnets 154 are arranged at regular intervals in the circumferential direction so as to be magnetized to alternately change the magnetization direction for each magnetic pole. As a result, the rotor 150 forms twelve magnetic poles.

The permanent magnets 154 may be embedded in the magnet slots of the rotor core 152 after the permanent magnets 154 have been magnetized, or may be inserted into the magnet slots of the rotor core 152 before the permanent magnets 154 is magnetized, and thereafter magnetized by application of a strong magnetic field.

The magnetic force of the permanent magnets 154 that have been magnetized is strong, and when the magnet is magnetized before the permanent magnets 154 are fixed to the rotor 150, a strong attraction force is generated between the permanent magnets 154 and the rotor core 152 when fixing the permanent magnets 154, and the attraction force interferes with the operation. Also, dust such as iron powder could adhere to the permanent magnets 154 due to the strong attraction force. For those reason, it is desirable to magnetize the permanent magnets 154 after the permanent magnets 154 have been inserted into the magnet slots of the rotor core 152 from the viewpoint that the productivity of the rotating electric machine 100 is improved. As the permanent magnets 154, a sintered magnet of neodymium series or samarium series, ferrite magnet, or a bond magnet of neodymium series can be used. As a residual magnetic flux density of the permanent magnets 154 is desirably about 0.4 to 1.3 T, the magnet of neodymium series is more proper.

In this embodiment, auxiliary magnet poles 160 are formed between the respective permanent magnets 154 forming the magnetic poles. The auxiliary magnet poles 160 operate so that a magnetic resistance of a q-axial magnetic flux generated by the stator coil 138 becomes smaller. Then, because the magnetic flux of the q-axial magnetic flux becomes to be very smaller than the magnetic resistance of the d-axial magnetic flux due to the auxiliary magnet poles 160, a large reluctance torque is generated.

When a three-phase AC current is supplied to the stator coil 138 to generate the rotating magnetic field in the stator 130, the rotating magnetic field is exerted on the permanent magnets 154 of the rotor 150 and the magnet torque is generated. Since the above-mentioned reluctance torque is generated in the rotor 150 in addition to the magnet torque, both of the above-mentioned magnet torque and reluctance torque are exerted on the rotor 150 as the rotating torque, thereby being capable of obtaining a large rotating torque.

(Description of Rotor Coil)

Figure 6:
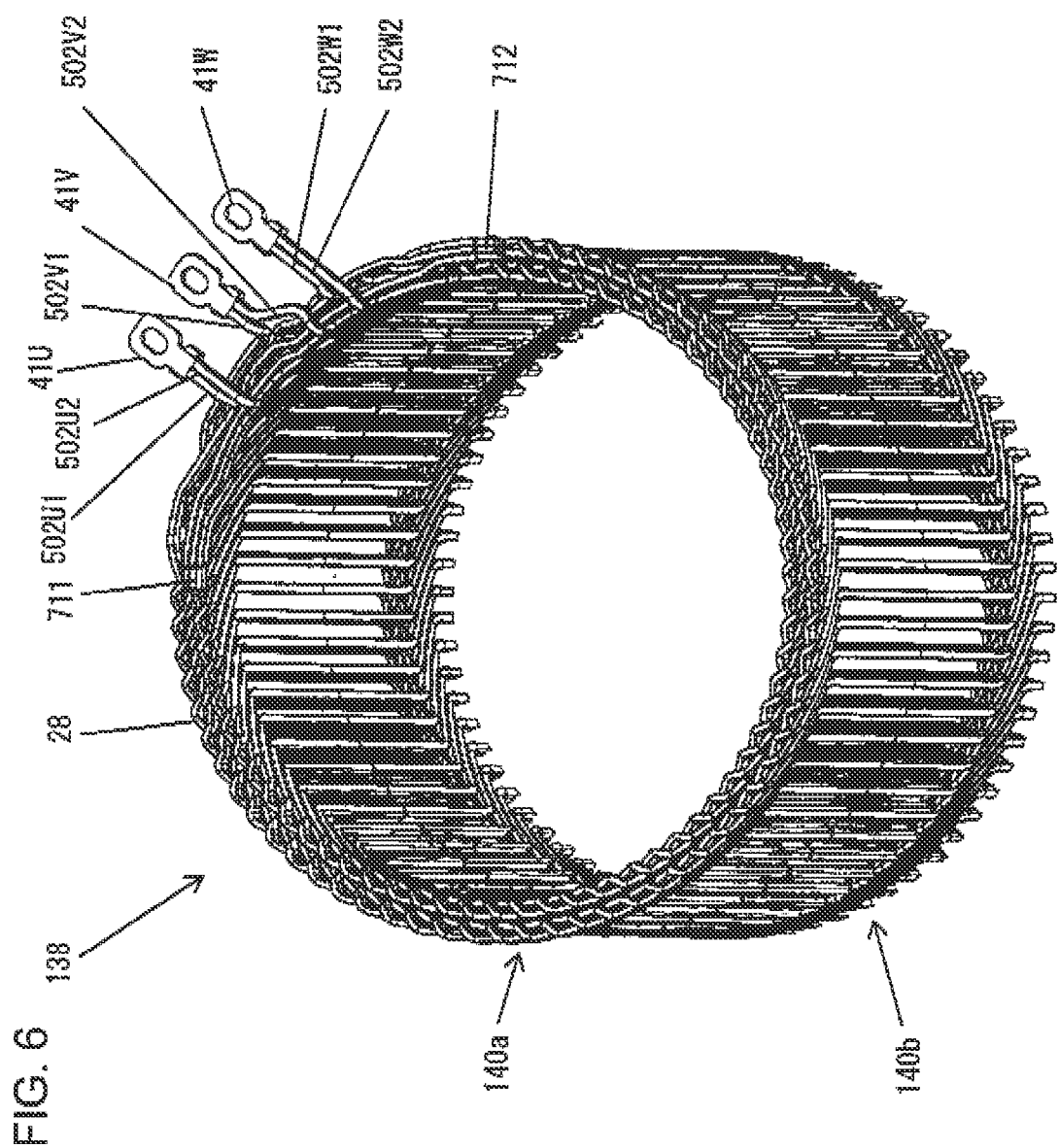
FIG. 6 is a perspective view illustrating a stator coil 138.
Figure 7:
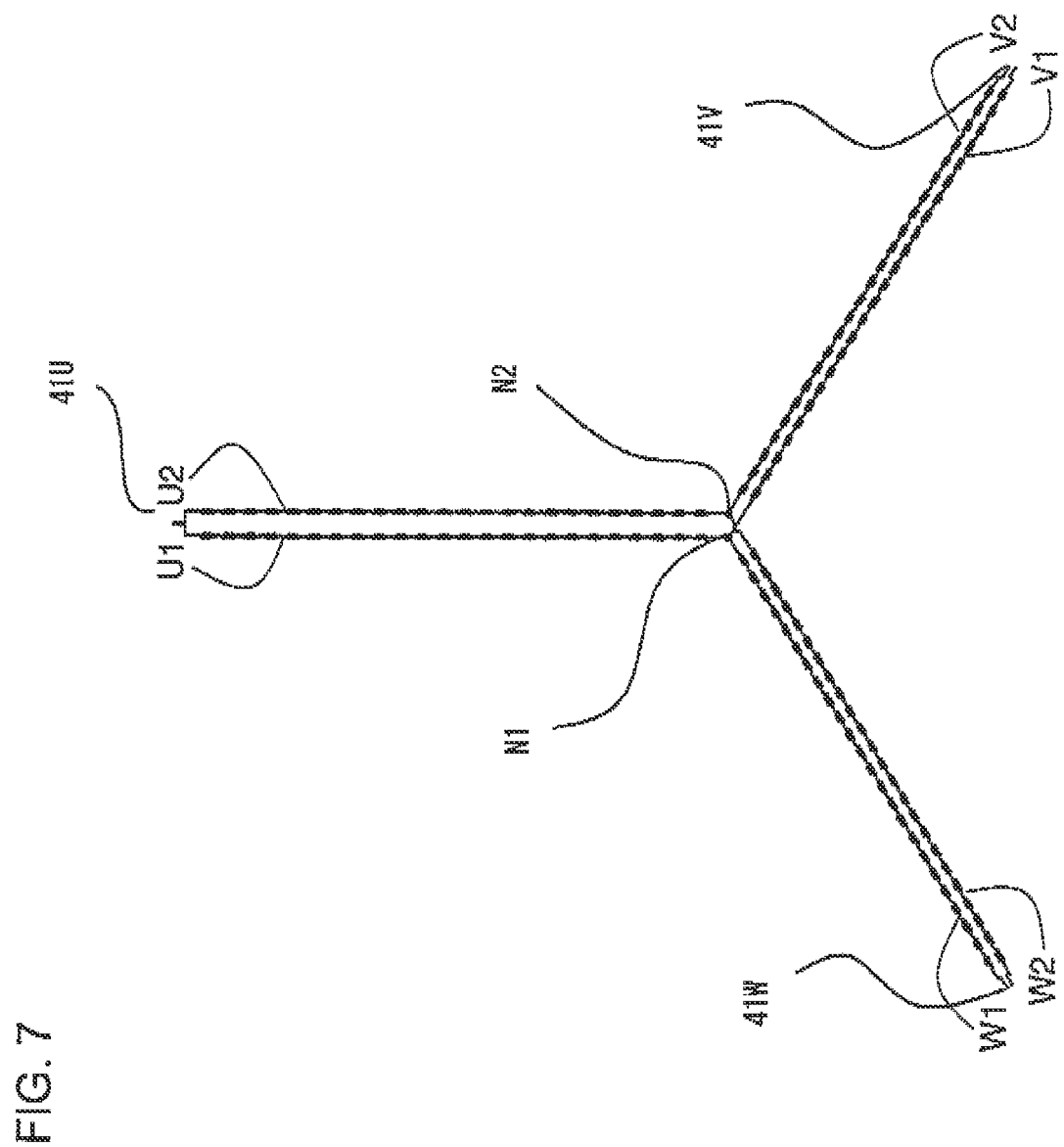
FIG. 7 is a diagram illustrating a star connection.

FIG. 6 is a perspective view illustrating the stator coil 138 for three phases. The stator coil 138 is connected with the configuration of a star connection as illustrated in FIG. 7. In this embodiment, there is applied the stator coil 138 having the two-star configuration in which two star connections are connected in parallel. That is, the two-star configuration includes a star connection of a U1 phase, a V1 phase, and a W1 phase, and a star connection of a U2 phase, a V2 phase, and a W2 phase. Lead wires of the U1 and U2 phases are collected into one piece by an AC terminal 41U, lead wires of the V1 and V2 phases are collected into one piece by an AC terminal 41V, and lead wires of the W1 and W2 phases are collected into one piece by an AC terminal 41W. N1 and N2 are neutral points of the respective star connections.

Also, the stator coil 138 is winded in a distributed winding system. The distributed winding is a winding system in which phase winding coils are winded on the stator core 132 so that the phase wining coils are stored in two of the slots 420 which are distant from each other over the plurality of slots 420. This embodiment has a featured that since the distributed winding is applied as the winding system, the developed magnetic flux distribution is closer to a sine wave than that of a concentrated winding, and the reluctance torque is easily generated. For that reason, the rotating electric machine 100 improves in the controllability of a field-weakening control and a control utilizing the reluctance torque, is available over a wide rotating speed range from a low rotating speed to a high rotating speed, and can obtain excellent motor characteristics suitable for an electric vehicle.

The stator coil 138 may be circular or square in cross-section. A structure in which an inner cross-section of the slots 420 is used as efficiently as possible, and spaces within the slots are reduced tends to lead to an improvement in the efficiency. Therefore, the square shape in cross-section is desirable from the viewpoint of an improvement in the efficiency. The square shape in cross-section of the stator coil 138 may be shorter in the circumferential direction of the stator core 132, and longer in the radial direction. Conversely, the square shape may be longer in the circumferential direction, and shorter in the radial direction. In this embodiment, the stator coil 138 is formed of a rectangular coil in which a rectangular cross-section of the stator coil 138 within each of the slots 420 is longer in the circumferential direction of the stator core 132, and shorter in the radial direction of the stator core 132. Also, an outer periphery of the rectangular coil is covered with an insulation coat.

In the stator coil 138 illustrated in FIG. 6, as illustrated in FIG. 2, coils of six systems (U1, U2, V1, V2, W1, W2) in total are loaded in close contact with the stator core 132. The coils of the six systems configuring the stator coil 138 are arranged at mutually proper intervals by the slots 420. As illustrated in FIG. 6, the AC terminals 41U, 41V, and 41W which are respective input/output terminals of the three phases of U, V, and W, and neutral wire connection portions 711 and 712 are arranged on one coil end 140a side of the stator coil 138.

In order to improve the workability in assembling the rotating electric machine 100, the AC terminals 41U, 42V, and 43W for receiving the three-phase AC power are arranged to be protruded from the coil end 140a outward in the axial direction of the stator core 132. The stator 130 is connected to a power conversion device not shown through the AC terminals 41U, 42V, and 43W to supply the AC power.

As illustrated in FIGS. 2 and 6, the coil ends 140a and 140b which are portions protruded from the stator core 132 outward in the axial direction are arranged in order as a whole, and the overall rotating electric machine is downsized. Also, the arrangement of the coil ends 140a and 140b in order is desirable from the viewpoint of an improvement in the reliability of the insulation characteristic.

Figure 8:
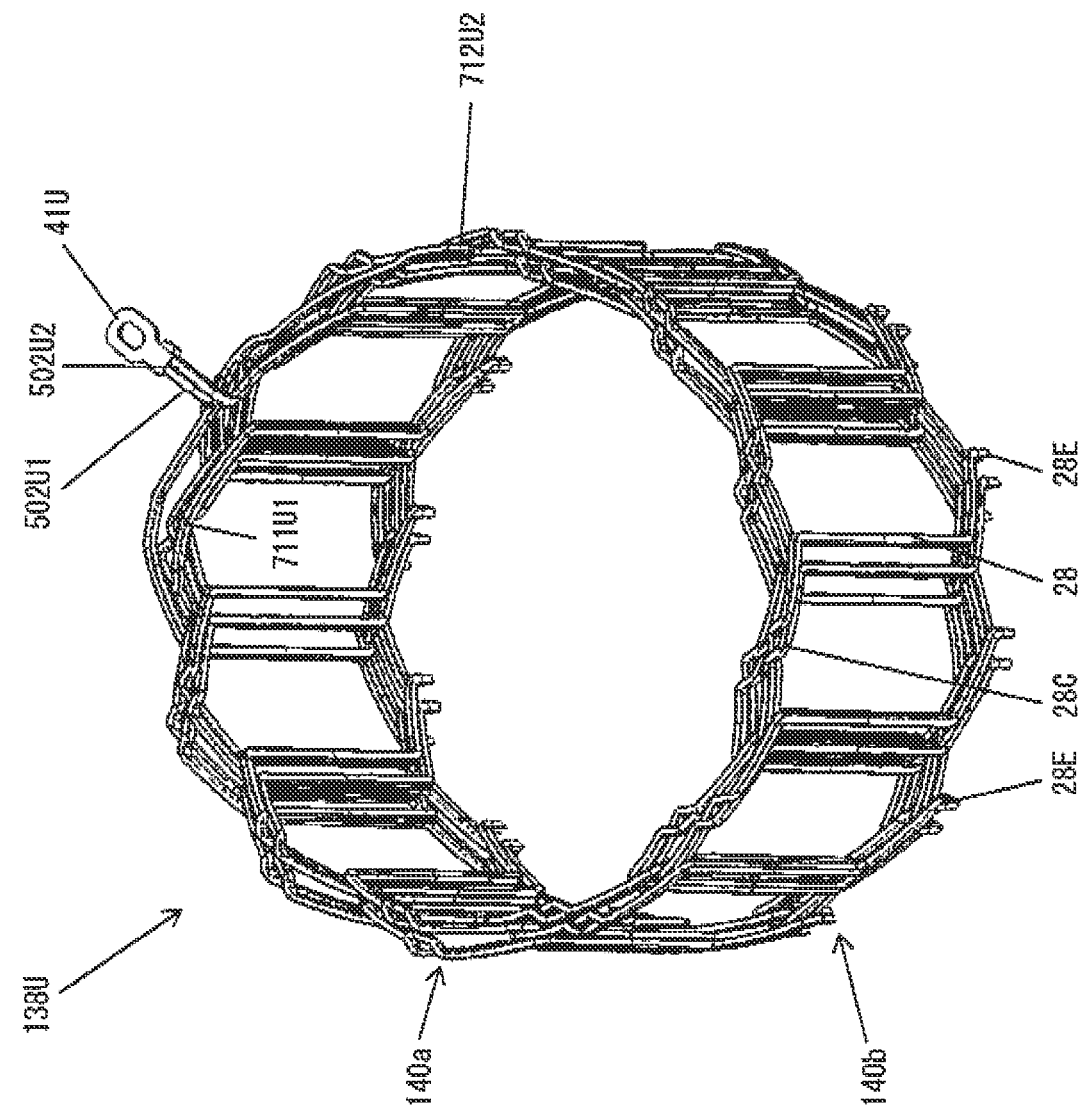
FIG. 8 is a perspective view illustrating a stator coil 138U.
Figure 9:
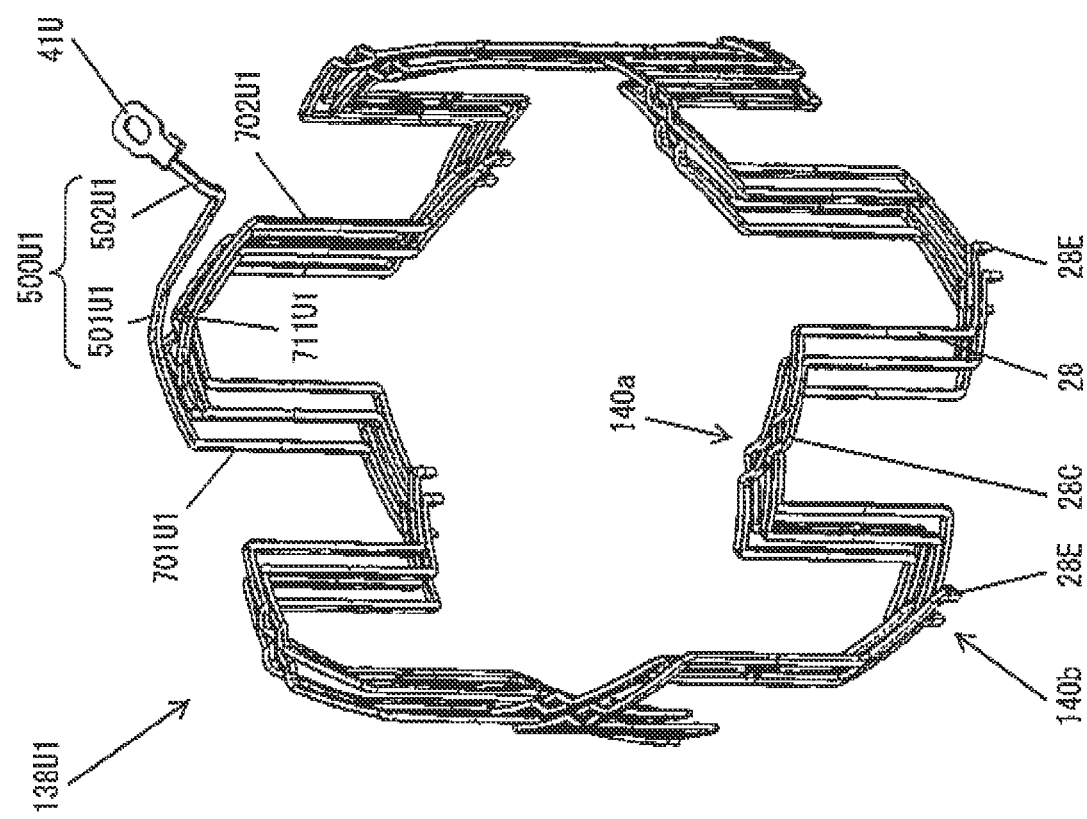
FIG. 9 is a perspective view illustrating a stator coil 138U1.
Figure 10:
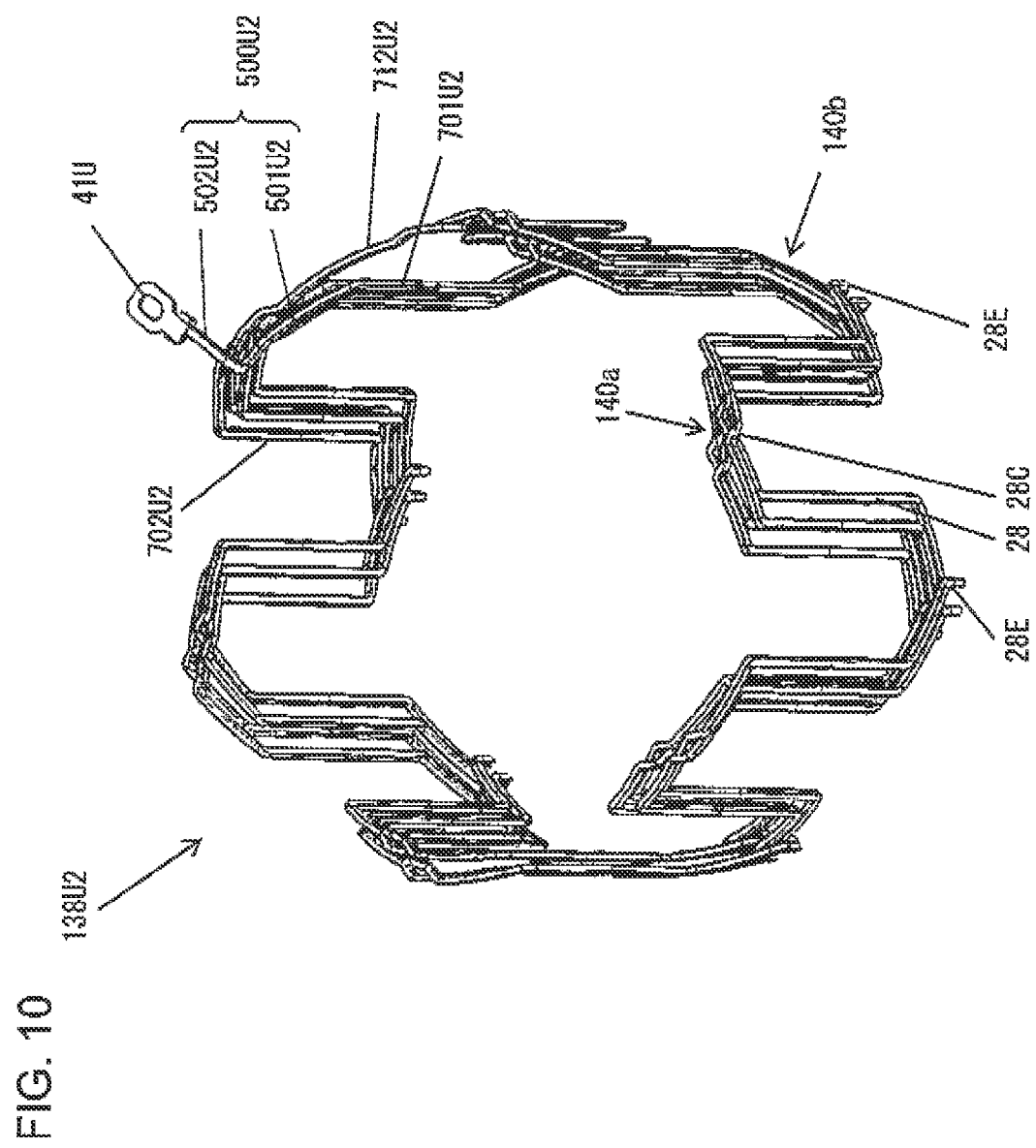
FIG. 10 is a perspective view illustrating a stator coil 138U2.

FIG. 8 is a perspective view illustrating the stator coil 138U of the U phase winded on the stator core 132. FIGS. 9 and 10 are perspective views illustrating the stator coil 138U1 of the U1 phase, and the stator coil 138U2 of the U2 phase, which configure the stator coil 138U. As is apparent from FIGS. 9 and 10, the stator coil 138 is formed of a segment coil in which the plurality of segment coils 28 each having the U-shaped wire is connected to each other. The segment coils 28 each have a top portion 28c arranged on one coil end 140a. Also, both ends 28E of one segment coil 28 are connected to another segment coil 28 on the other coil end 140b.

Figure 11:
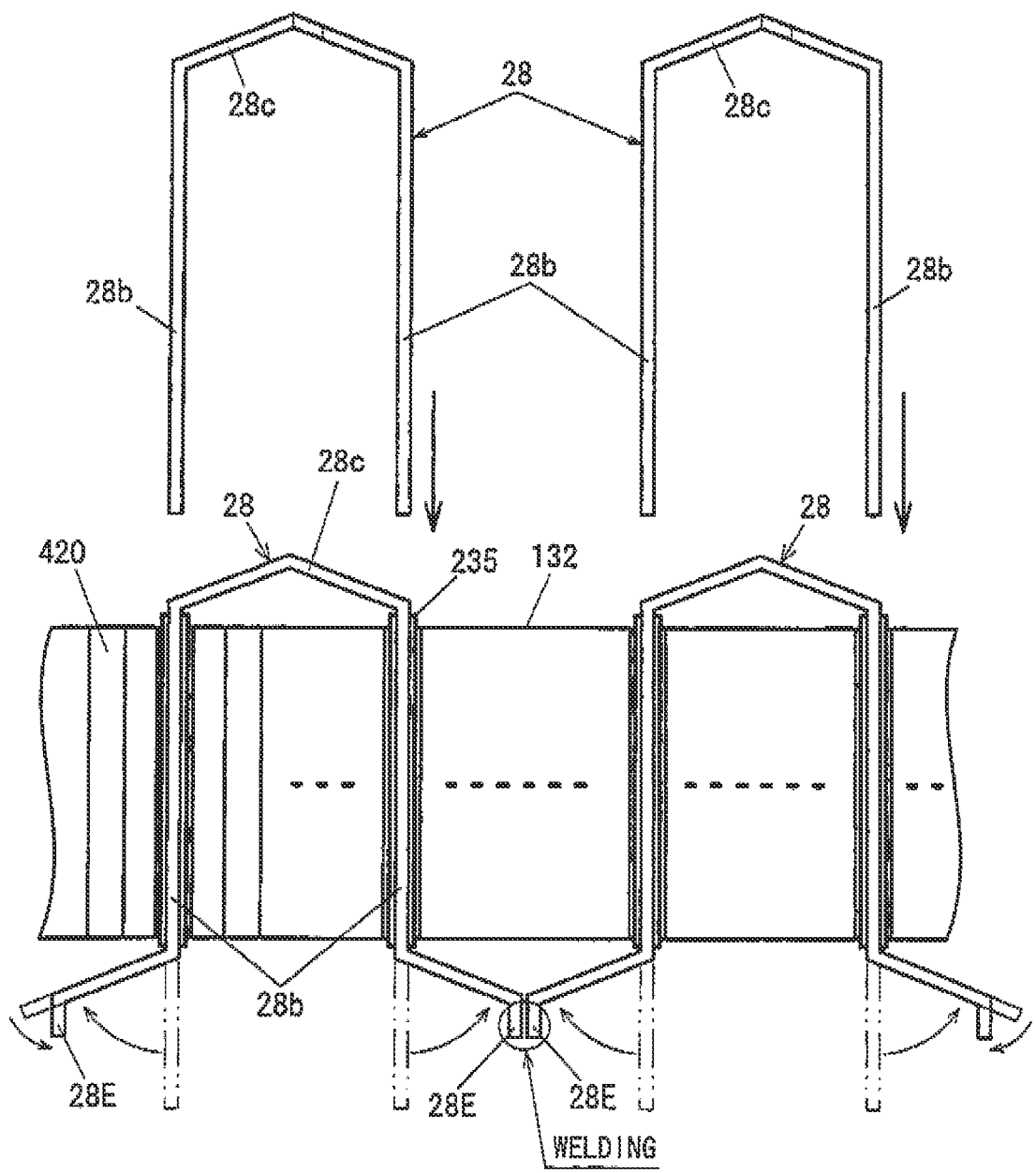
FIG. 11 is a diagram illustrating a connection method of a segment coil 28.

FIG. 11 is a diagram illustrating a connection method of the segment coil 28. The segment coils 28 which have not yet been loaded into the slots 420 of the stator core 132 are each formed of a U-shaped wire including a chevron top portion 28c and straight portions 28b as illustrated in an upper side of the figure. Each of the segment coils 28 is inserted into the slot 420 from the coil end 140a side (refer to FIG. 2) of the stator core 132. After the segment coils 28 have been inserted into the slots 420, each of the straight portions 28b protruded from the stator core 132 to the opposite side (coil end 140b side in FIG. 2) is bent in a direction of the adjacent segment coil to be connected, and an end 28E thereof is bent downward in the figure. Then, the end 28E, and an end 28E of the adjacent segment coil 28 are connected to each other by welding.

In this way, the main coil having the plurality of segment coils 28 connected to each other is formed. Then, a sub-coil including the lead wire and a sub-coil including the neutral wire are connected to both ends of the main coil configured by the segment coils 28 to form one phase coil. In this way, the main coil is configured by using the segment coils 28 which are wires formed in advance in, insulation between the wires is ensured, and no load is applied to the insulation coat.

In the stator coil 138U1 of the U1 phase illustrated in FIG. 9, a sub-coil 701U1 connected with the AC terminal 41U includes a portion stored in the slots of the stator core 132, and a lead wire 500U1 led from the slots. In the stator coil 138 according to this embodiment, the sub-coil 701U1 is stored in a layer on an outermost peripheral side of the slots. The lead wire 500U1 includes a bend 501U1 bent to be curved, and a terminal portion 502U1 connected with the AC terminal 41U. The sub-coil 701U1 is connected to the end 28E of the segment coil 28 disposed on one end of the main coil of the U1 phase on the coil end 140b side. Also, the segment coil 28 disposed on the other end of the main coil is connected with a sub-coil 702U1 having a neutral wire 711U1.

On the other hand, similarly in the stator coil 138U2 of the U2 phase illustrated in FIG. 10, a sub-coil 701U2 connected with the AC terminal 41U includes a portion stored in the slots of the stator core 132, and a lead wire 500U2 led from the slots. The sub-coil 701U2 is stored in a layer on an innermost peripheral side of the slots. The lead wire 500U2 includes a bend 501U2 bent to be curved, and a terminal portion 502U2 connected with the AC terminal 41U. The bend 501U2 is led in a direction opposite to that of the bend 501U1 of the U1 phase. The sub-coil 701U1 is connected to the end 28E of the segment coil 28 disposed on one end of the main coil of the U1 phase on the coil end 140b side. Also, the segment coil 28 disposed on the other end of the main coil is connected with a sub-coil 702U2 having a neutral wire 712U2.

The terminal portions 502U1 and 502U2 are bent substantially perpendicularly to the coil end 140a in the outer circumferential direction of the stator core 132 from the coil end 140a. Although the description will be omitted, the stator coils of the U phase, the V phase, and the W phase also have the same configuration as the U phase coil. The stator coils of the U phase, the V phase, and the W phase are displaced at given slot pitches in the circumferential direction. As illustrated in FIG. 6, the AC terminals 41U, 41V, and 41W are arranged to be concentrated on one portion for connection to the cable, and all arranged in parallel to each other to be oriented in the same direction (direction substantially perpendicular to the coil end 140a).

The AC terminals 41U, 41V, and 41W are collected in the peripheral width within a given number of slots of the stator core 132. For example, when three slots are ensured for each phase in order to ensure mutual insulation, the AC terminals 41U, 41V, and 41W can be collected in about nine slots as a whole, but limited to nine slots. As illustrated in FIG. 6, the respective terminal portions of the AC terminals 41U, 41V, and 41W are bent so that the respective phases become substantially parallel to each other. Because the respective phases of U, V, and W are arranged so that the terminal portions are arranged in parallel, the rigidity of the terminal portions can be enhanced. In this situation, the terminal portions to which an excessive tension or compression force is applied are adjacent to each other to absorb the tension and the compression force, and the occurrence of fatigue failure in the terminal portions can be suppressed.

As illustrated in FIG. 6, portions in which the AC terminals 41U, 41V, and 41W are disposed are collected in one place for connection to the cable, and a convex area of the neutral coil routing of the upper portion of the coil end 140a is narrowed to ensure a gap between the upper portion and an emission portion. Also, a simple structure in which the securement of insulation between the wires, and the workability in manufacturing are taken into account while the AC terminals 41U, 41V, and 41W are concentrated on one place is provided.

Further, as illustrated in FIG. 2, the convex area of the routing of the neutral wire 711 on the coil end 140a is narrowed to lower the coil end 140a. For that reason, the neutral wires 711U1, 711V1, and 711W1 of the U1 phase, the V1 phase, and the W1 phase are routed on a left side shown in the figure of the AC terminals 41U, 41V, and 41W on the coil end 140a, and connected thereto. On the other hand, the neutral wires 712U2, 712V2, and 712W2 of the U2 phase, the V2 phase, and the W2 phase are routed on a right side shown in the figure of the AC terminals 41U, 41V, and 41W on the coil end 140a, and connected thereto.

In this embodiment, the lead wires 500U1, 500U2, and the neutral wires 711U1, 712U2 which are led from the coil end 140a are bent so that the routing on the coil end 140a becomes a shorter route whereby the coil end 140a and the core back 440 are downsized to reduce the wire resistor. Hereinafter, a bend shape of the lead wires 500U1 and 500U2, and a bend shape of the neutral wires 711U1 and 712U2 will be described.

Figure 12:
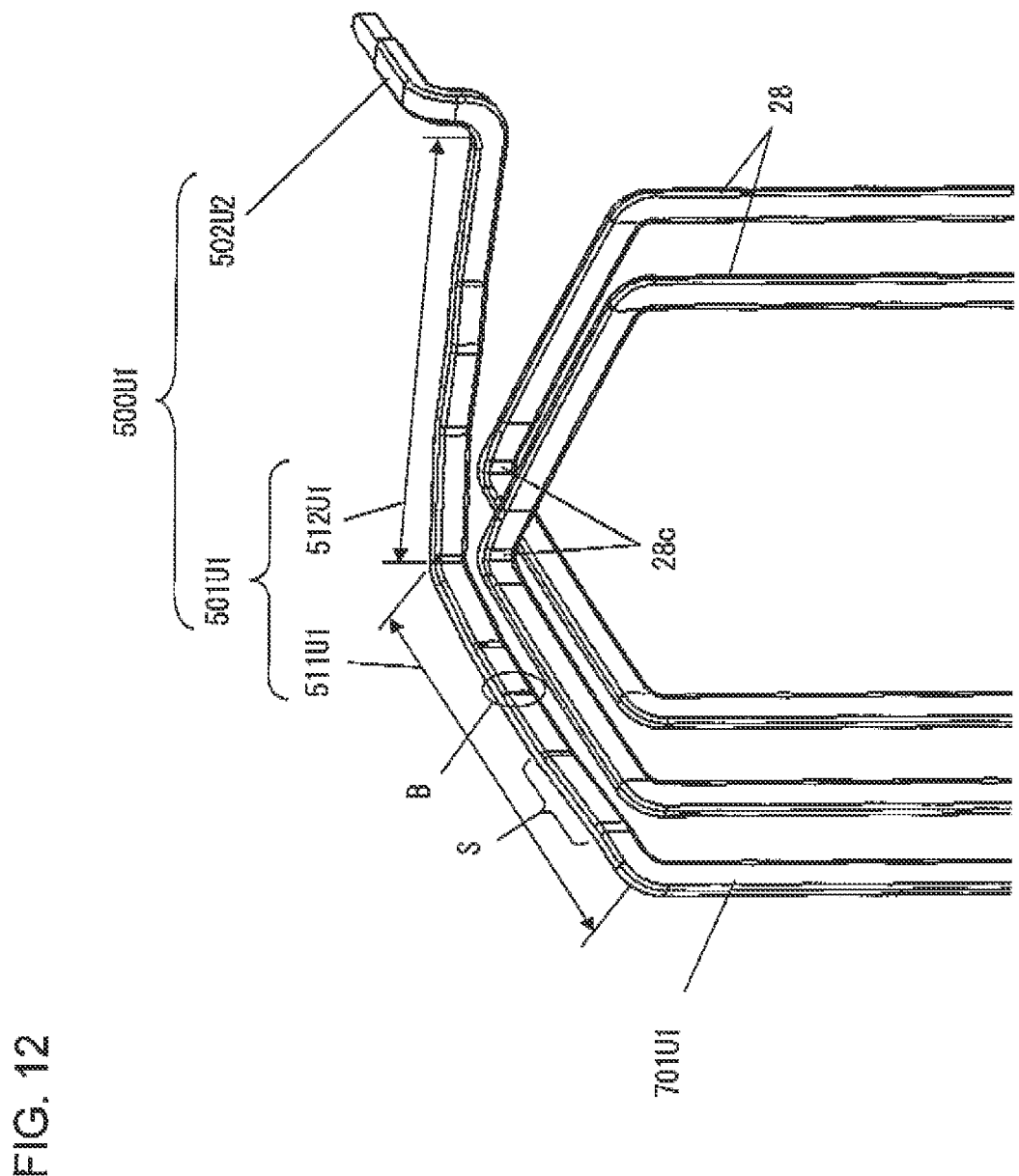
FIG. 12 is an enlarged view of a portion of a lead wire 500U1 illustrated in FIG. 9.

FIG. 12 is an enlarged view of a portion of the lead wire 500U1 illustrated in FIG. 9. The AC terminal 41U is omitted from the figure. The lead wire 500U1 illustrated in FIG. 12 includes a first wire portion 511U1, a second wire portion 512U1, and the above-mentioned terminal portion 502U1. The first wire portion 511U1 is a portion rising obliquely upward from a straight (portion inserted into the slot 420) of the sub-coil 701U1, and extended to above the top portion 28c of the segment coils 28, and creates an arch along the top portion 28c.

Also, the second wire portion 512U1 is a wire portion routed above the plurality of top portions 28c (refer to FIG. 6). Since only two segment coils are illustrated in FIG. 12, the number of top portions 28c is also two. However, in fact, a large number of top portions 28c are aligned in an arc on the coil end 140a. Further, the terminal portion 502U1 is bent to be curved from the second wire portion 512U1 substantially perpendicularly to an outer circumferential direction of the coil end 140a. In the example illustrated in FIG. 12, the terminal portion 502U1 rises upward from the second wire portion 512U1 once so that wide surfaces of the rectangular wire are oriented vertically, and then is bent in the outer circumferential direction.

In this embodiment, a forming process (automatic forming process) is used for forming the lead wire 500U1 having a complicated shape as illustrated in FIG. 12. Up to now, the forming process was not used for forming the rectangular wire having the insulation coat, but die forming was used to form the rectangular wire into a more simplified shape. In the forming of the segment coils 28, forming using a die is used as in the conventional art.

Figure 13:
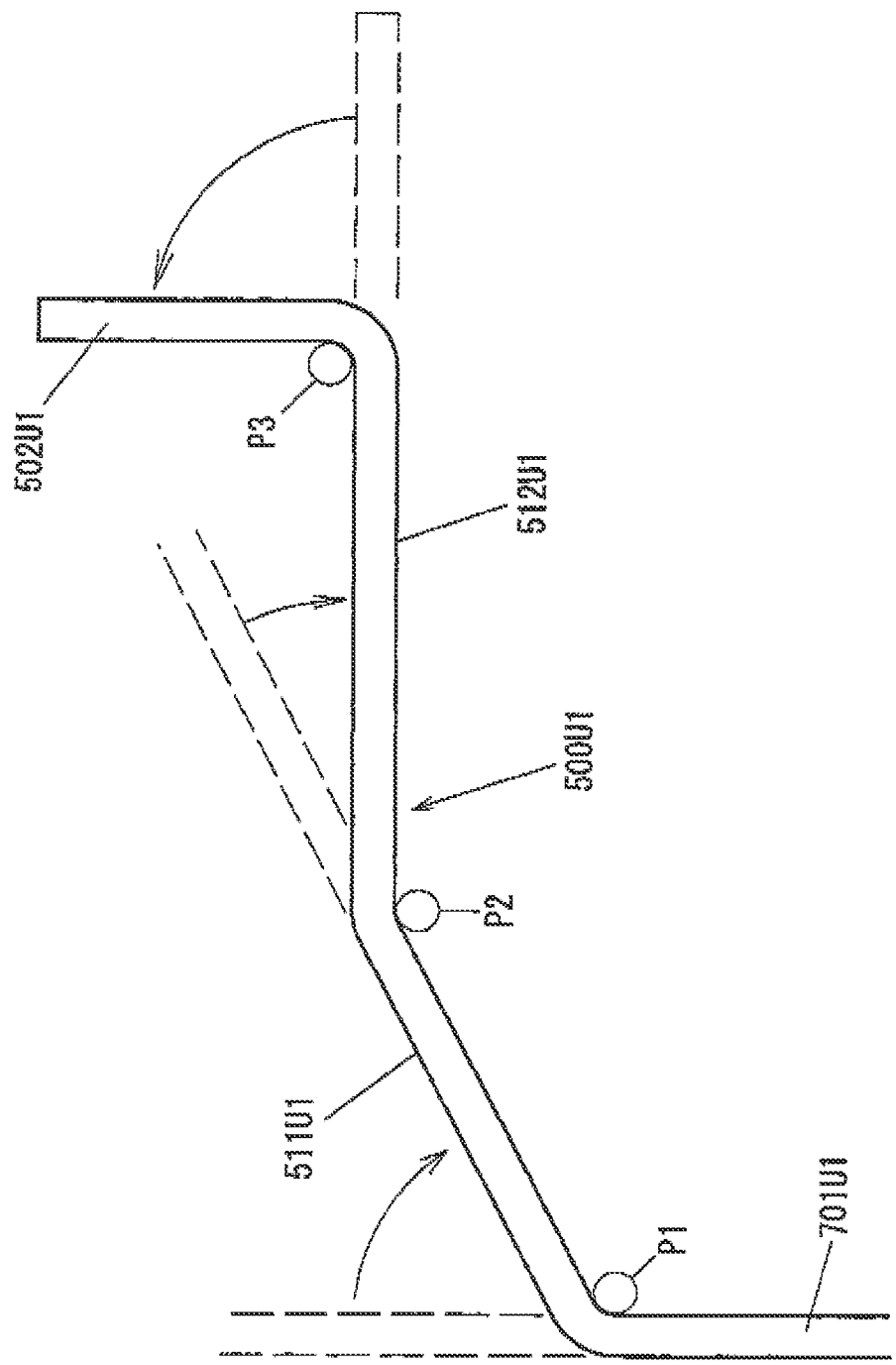
FIG. 13 is a diagram illustrating a forming process of the lead wire 500U1 which is viewed from a center side of the stator core 132.
Figure 14:
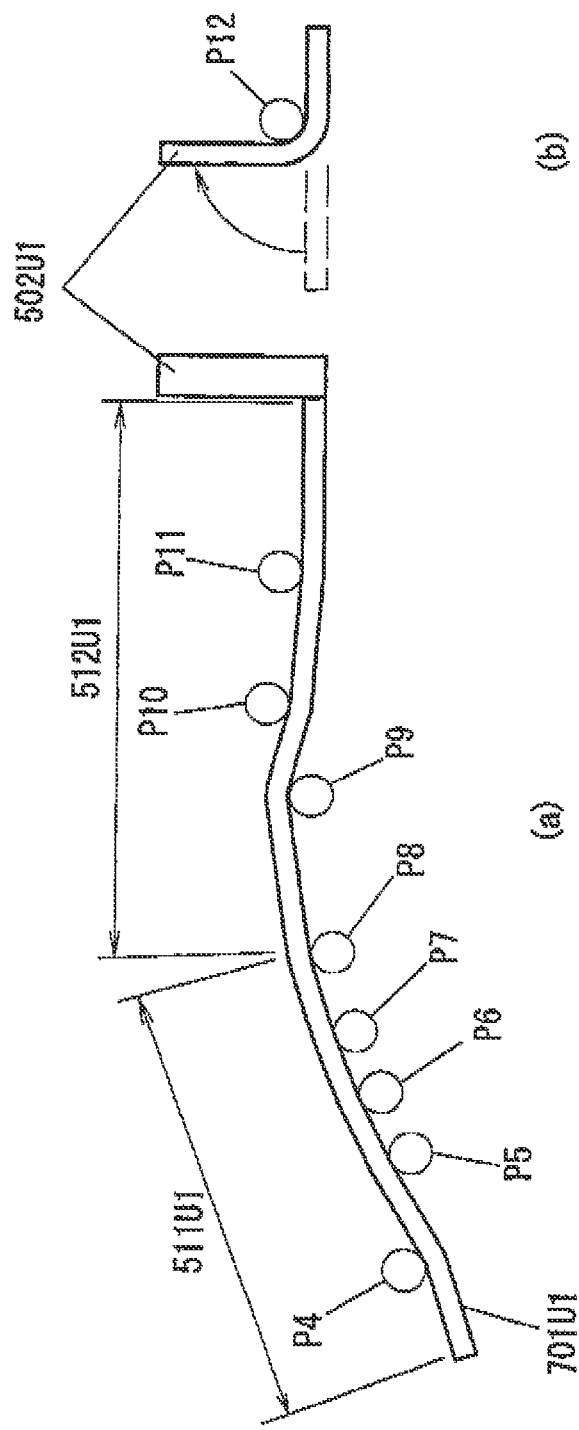
FIG. 14 is a diagram illustrating a forming process of the lead wire 500U1 which is viewed along an axial direction thereof.

FIGS. 13 and 14 are diagrams illustrating the forming press of the lead wire 500U1. FIG. 13 is a diagram viewed from a center side of the stator core 132, and FIG. 14 is a diagram viewed from above of the coil end 140a along the axial direction. As understood from FIGS. 13 and 14, the lead wire 500U1 is bent sterically (three-dimensionally), and it is very difficult to form such shape with the use of the die.

In the example illustrated in FIGS. 13 and 14, the bending process using the forming process is conducted in the order of FIGS. 13, 14(a), and 14(b). P1 to P12 indicate positions of the molding pins when conducting the forming process. The bending process is conducted in the order to P1 to P12. In FIG. 13, the pins are abutted against narrow surfaces of the rectangular wire to conduct the bending process. The sub-coil 701U1 is bent in the order of the pin positions P1, P2, and P3 to form the first wire portion 511U1, the second wire portion 512U1, and the terminal portion 502U1.

Subsequently, in FIG. 14, the pins are abutted against the wide surfaces of the rectangular wire to conduct the bending process. The sub-coil 701U1 is bent in the order of the pin positions P4, P5, P6, P7, and P8 to form a final shape of the first wire portion 511U1. The first wire portion 511U1 is curved in the radial direction of the coil end. Then, the first wire portion 511U1 is bent in the order of the pin positions P9, P10, and P11 to form a final shape of the second wire portion 512U1. Finally, the first wire portion 511U1 is bent at 90 degrees in the pin position P12 to form a portion of the terminal portion 502U1.

In this way, because the lead wire 500U1 is bent by the forming process, as illustrated in FIG. 12, the lead wire 500U1 includes a plurality of bends B against which the molding pins are abutted, and straights S between one bend B and an adjacent bend B. The pin abutted portions of the bends B are formed with impressions of the molding pins. When the plurality of bending is thus conducted, even if the bend 501U1 has a complicated curved shape, the bend 501U1 can be approximated by a polygonal line with high precision. At least two bends B are formed in the second wire portion 512U1 routed to be curved in the vicinity of the top portion of the coil end 140a so as to more approximate an ideal shape.

Figure 15:
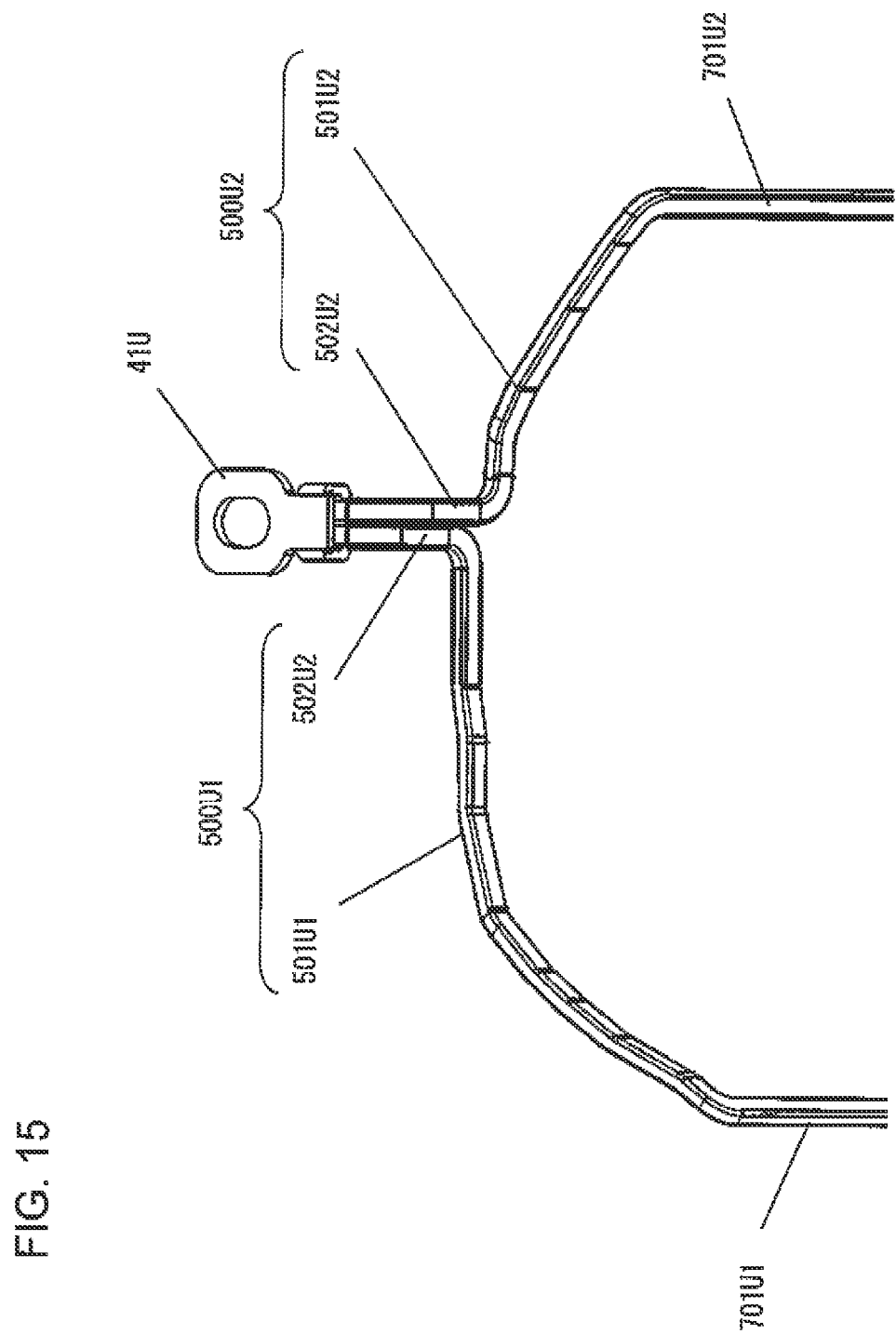
FIG. 15 is a diagram illustrating a lead wire 500U1 of a U1 phase coil and a lead wire 500U2 of a U2 phase coil.

FIG. 15 illustrates the lead wire 500U1 of the U1 phase coil and the lead wire 500U2 of the U2 phase coil. The terminal portion 502U1 of the lead wire 500U1 and the terminal portion 502U2 of the lead wire 500U2 are connected to the AC terminal 41U in common. Because of a relationship of the arrangement of the AC terminal 41U, lengths of the lead wires 500U1 and 500U2 are different from each other. Also, since a route position is different between the bend 501U1 and the bend 501U2, the bend shape is also different from each other. As illustrated in FIG. 15, since a shape in which the lead wire 500U1 of the U1 phase coil and the lead wire 500U2 of the U2 phase coil are connected to each other by the AC terminal 41U is trapezoidal, the rigidity can be enhanced. As a result, a natural frequency of the coil per se can be reduced as compared with a cantilever structure.

Figure 16:
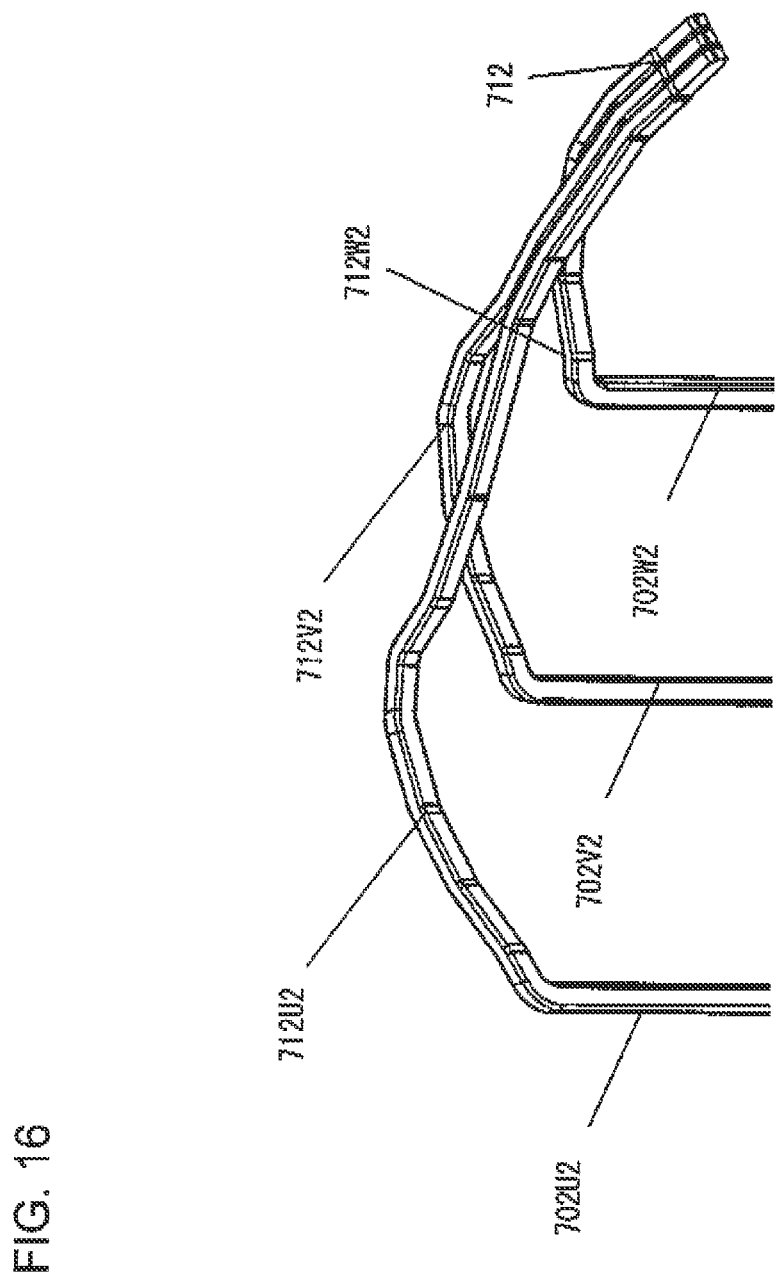
FIG. 16 is a diagram illustrating a portion of a neutral wire connection portion 712 in FIG. 6.
Figure 17:
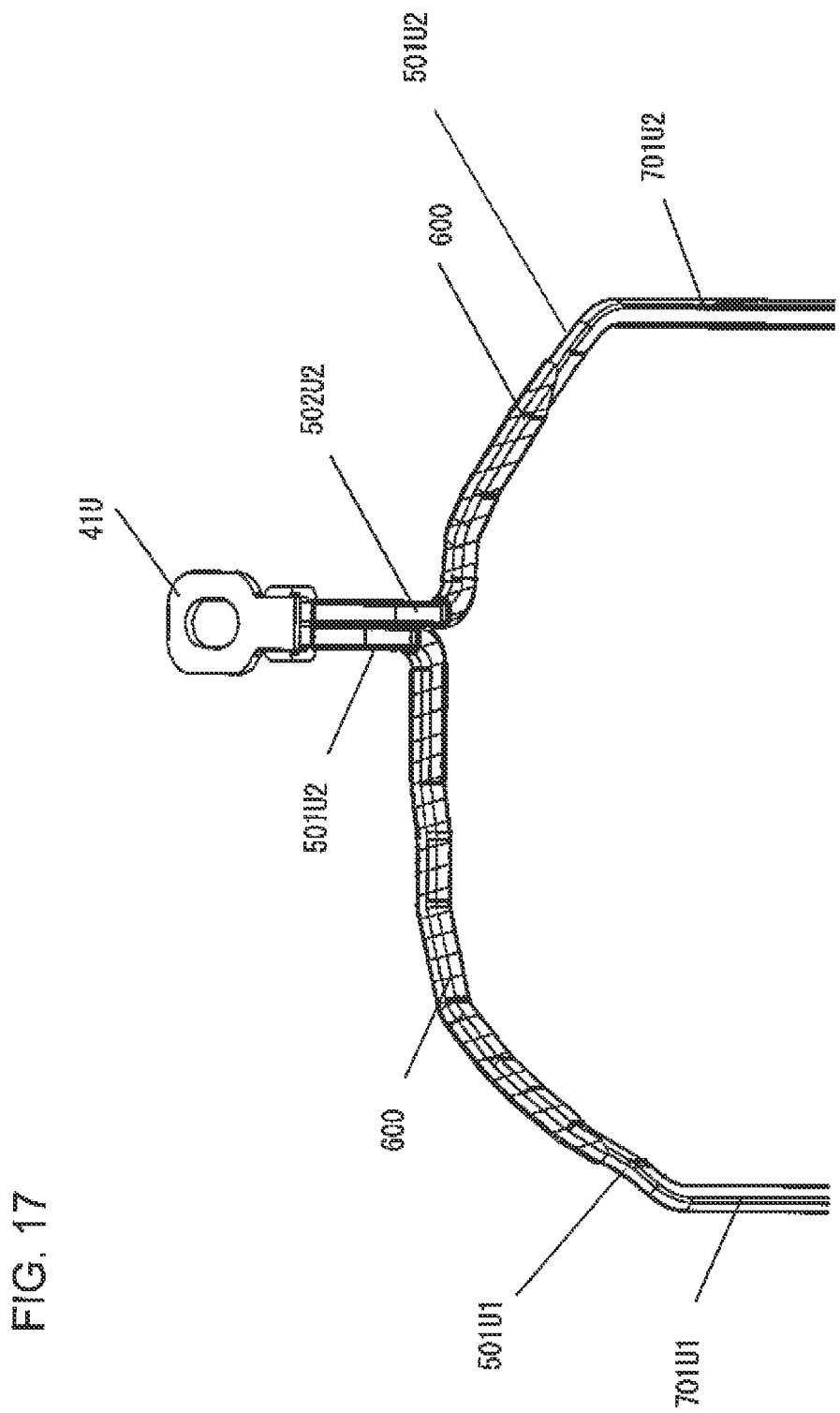
FIG. 17 is a diagram illustrating the U1 phase connected to an AC terminal 41U, and a lead wire of the U1 phase.

FIG. 16 is a diagram illustrating a portion of the neutral wire connection portion 712 in FIG. 6. The neutral wire connection portion 712 is a portion in which the neutral wire 712U2 of the U2 phase, the neutral wire 712V2 of the V2 phase, and the neutral wire 712W2 of the W2 phase are connected to each other, which is a portion corresponding to the neutral point N2 in FIG. 7. Because the slots into which the sub-coils 702U2, 702V2, and 702W2 of the U2, V2, and W2 phases are inserted are displaced from each by a given slot interval, the lengths of the neutral wires 712U2, 712V2, and 712W2 are different according to the displacement, and the shapes of them are also different from each other.

Figure 18:
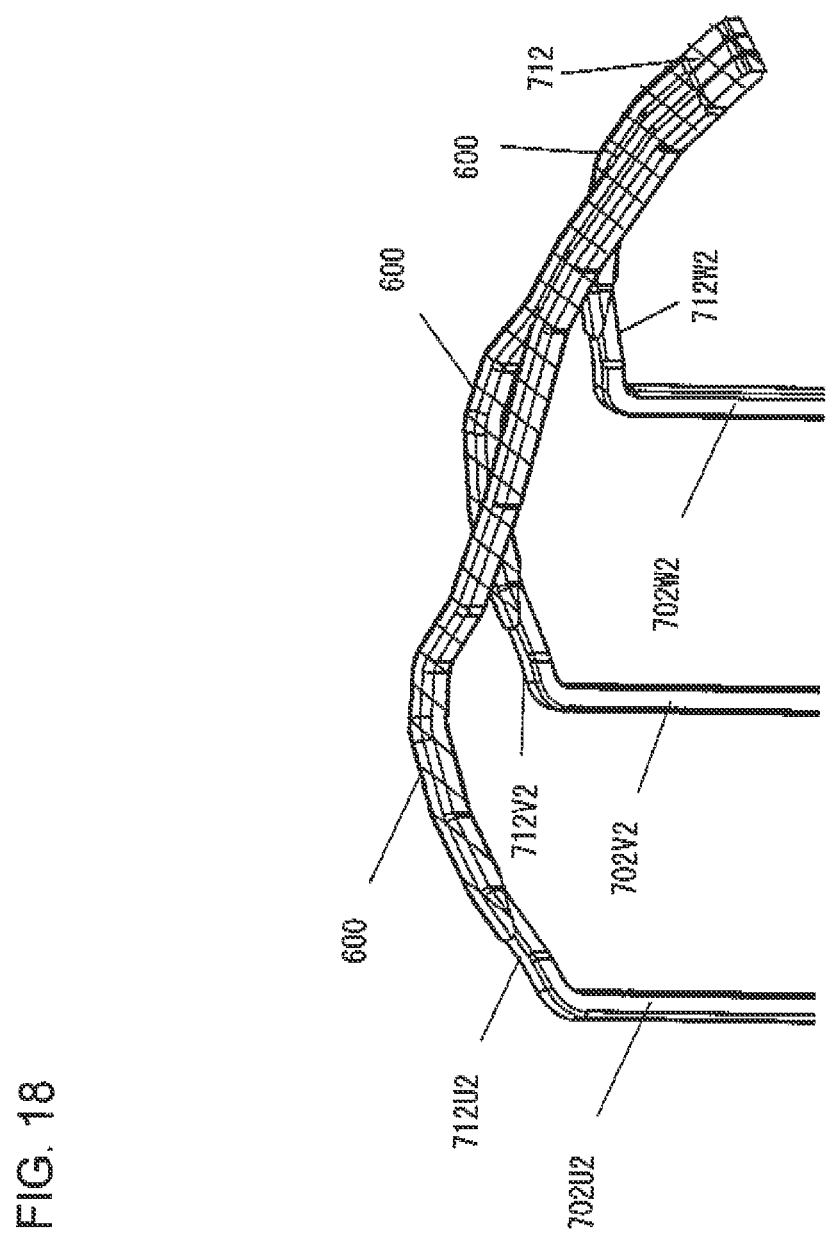
FIG. 18 is a diagram illustrating neutral wires 712U2, 712V2, and 712W2 connected by a neutral wire connection portion 712.

If the AC terminal 41U is connected as illustrated in FIG. 15, an insulation coat 600 is formed on the bends 501U1 and 501U2 which are portions led from the slots of the sub-coils 701U1 and 701U2, thereby ensuring a sufficient withstand voltage in those portions. The insulation coat 600 is properly formed of, for example, an insulating powder coating film. As a coating material (powder) used for insulating power coating, an insulating epoxy resin or the like is used. Likewise, if the three neutral wires 712U2, 712V2, and 712W2 are connected to each other as illustrated in FIG. 16, the insulation coat 600 is formed on the portion to which those neutral wires are led as illustrated in FIG. 18.

Second Embodiment

Figure 19:
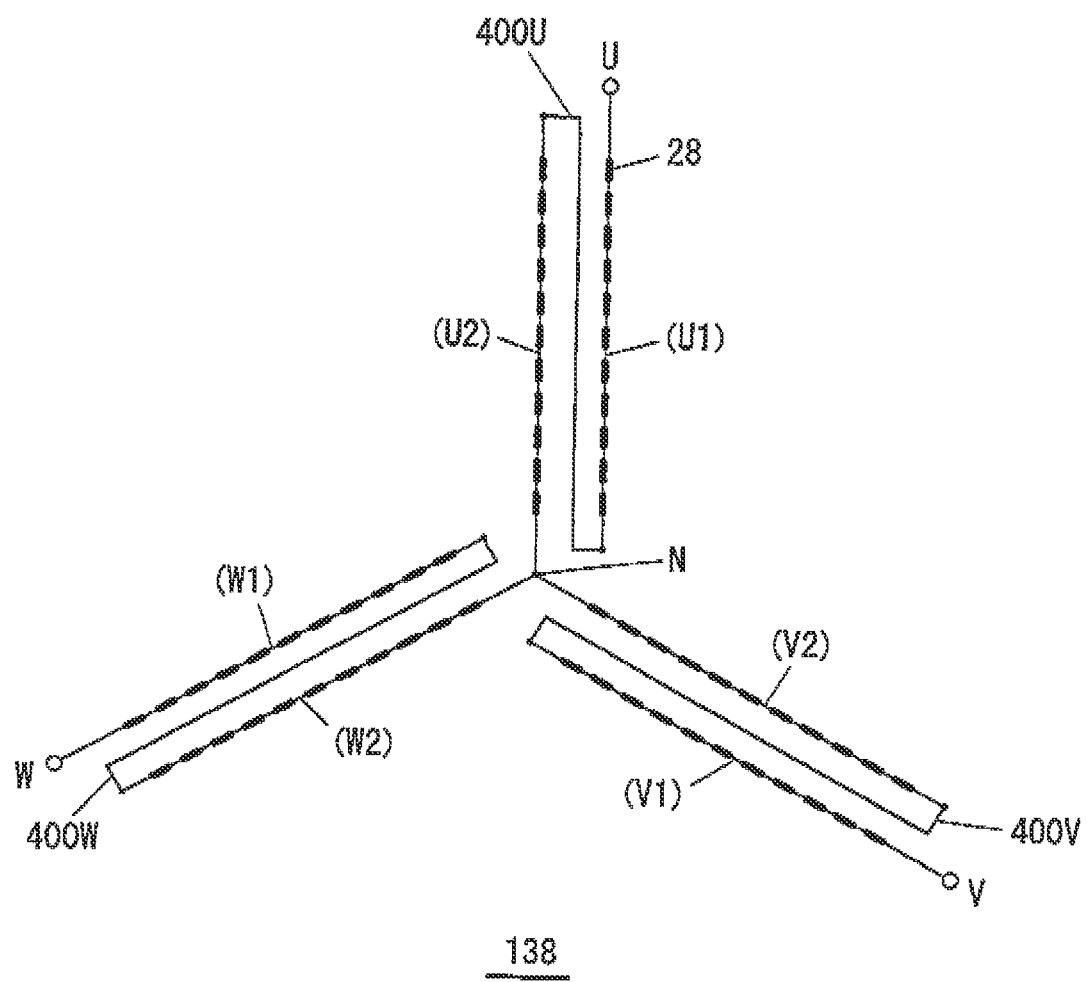
FIG. 19 is a diagram illustrating a connection structure of a stator coil according to a second embodiment.
Figure 20:
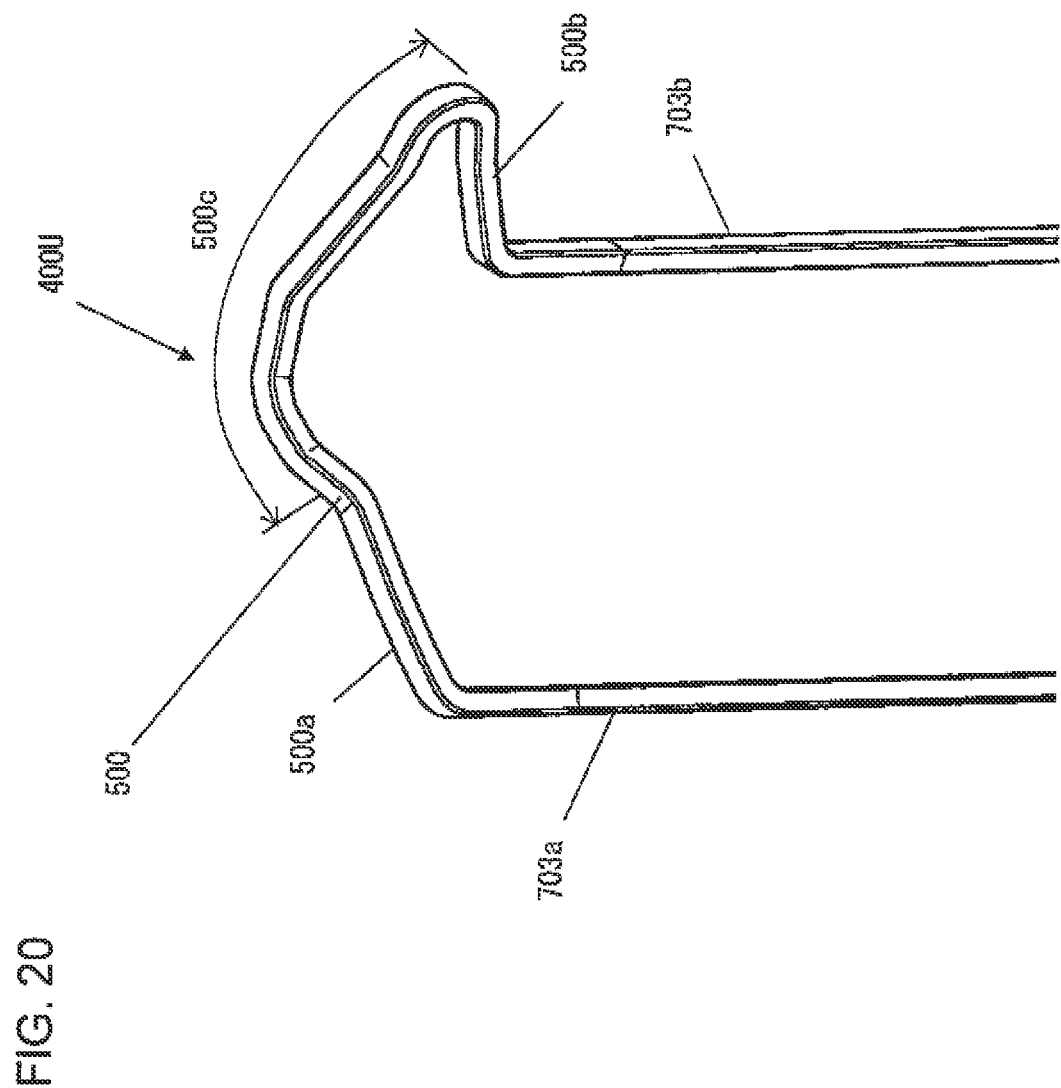
FIG. 20 is a diagram illustrating a bridge wire 400U.

FIGS. 19 and 20 illustrate a second embodiment of the present invention. In the above-mentioned first embodiment, the stator coil 138 is of a two-star connection structure. On the other hand, in the second embodiment, the same segment coil 28 is of a one-star connection structure as illustrated in FIG. 19. When the U phase coil is viewed, the coils indicated by symbols U1 and U2 have the same configuration as that of the U1 phase coil and the U2 phase coil illustrated in FIG. 7, and the coil U1 and the coil U2 are connected to each other by a bridge wire 400U. The same is applied to the V phase and the W phase. The U phase, V phase, and W phase coils connected by the bridge wires 400U, 400V, and 400W are connected to each other at the neutral point N.

FIG. 20 illustrates the bridge wire 400U, and the bridge wires 400U and 400W also have the same structure as that of the wire 400U. In this example, the bridge wire 400U will be typically described. The bridge wire 400U includes straight wire portions 703a and 703b inserted into the slots, and a coupling portion 500 that connects those straight wire portions 703a and 703b. Also, the coupling portion 500 is a portion led to the outside of the slots, and includes oblique portions 500a and 500b which are lead portions from the slots, and a route portion 500c that is routed on the coil end. The oblique portions 500a and 500b are arranged in gaps of the segment coils 28 group.

The wire led from the straight wire portion 703b as indicated by the oblique portion 500b is bent in an opposite direction, and thereafter connected to the oblique portion 500a. In this embodiment, the forming process is applied to the formation of the coupling portion 500 of the bridge wire 400U in addition to the lead wire and the neutral wire described in the first embodiment. In the bridge wire 400U thus having the complicated shape, the coupling portion 500 formed by a polygonal line close to an ideal line can be easily obtained by the forming process. That is, the coupling portion 500 is configured by straights and bends.

The above-mentioned embodiment has the operation and effects described below.

(1) As illustrated in FIGS. 6, 8, 9, and 10, the stator coil 138U1 includes: the main coils in which the plurality of segment coils 28 each having the rectangular cross-section wire formed into the substantially U-shaped wire in advance is connected to each other; the sub-coil 701U1 having the lead wire 500U1 led from the slot 420 and attached with the AC terminal 41U, and connected to one end of the respective main coils; and the sub-coil 702U1 having the neutral wire 711U1 led from the slots, and connected to the other end of the respective main coils. The stator coil 138 illustrated in FIG. 6 has six sets of the above phase coils of U1, U2, V1, V2, W1, and W2. For example, the lead wire 500U1 of the sub-coil 701U1 and the neutral wire 711U1 of the sub-coil 702U1 are configured by the wire with a bend structure having the plurality of straights S and bends B.

The lead wire 500U1 and the neutral wire 711U1 are each formed of the wire having the bend structure, thereby making it easy to allow the shapes of the lead wire 500U1 and the neutral wire 711U1 to approximate ideal shapes respectively. As a result, a useless routing can be suppressed, and a reduction in the coil usage and a reduction in the wire resistor can be conducted. Also, the routing on the coil end 140a is downsized, and the coil end 140a and the core back 440 can be reduced.

(2) Further, the lead wire 500U1 includes the first wire portion 511U1 that is the first wire area led from the slots and arriving at the top portion 28c of the segment coils 28, the terminal portion 502U1 that is the terminal connection area disposed at the head of the lead wire leading portion, and the second wire portion 512U1 which is the coil end route area between the terminal portion 502U1 and the first wire portion 511U1. Then, the second wire portion 512U1 is bent sterically so as to form two or more bends B, thereby allowing the shape of the second wire portion 512U1 routed on the coil end 140a to approximate the ideal shape. As a result, an increase in the height of the overall coil end by routing the lead wire 500U1 can be suppressed.

(3) Also, in the case of the wire structure using the bridge wires 400U to 400W illustrated in FIG. 19, as illustrated in FIG. 20, the coupling portion 500 is configured by the wire with the bend structure having the plurality of straights and bends, thereby allowing the shape of the wire routed on the coil end to approximate the ideal shape, and the overall coil end can be prevented from being upsized.

(4) The bends are formed by the forming process for bending the wire while abutting the molding pin against the wire. The bend structure can be easily formed by using an automatic forming machine. When the forming process is conducted, the impression by the molding pin is formed in the bends on the wire surface. The total number of segment coils 28 is large, but classified into several kinds of shapes. Also, because the shape is relatively simple, it is suitable to use the forming using the die as in the conventional art from the viewpoints of the costs. On the other hand, the number of lead wires and neutral wires is 12 at the maximum even in the stator coil of the two-star connection, and the shapes are different from each other. For that reason, it will be very expensive to form the respective wires by the die.

On the other hand, when the lead wires and the neutral wires are bent by the forming process, this process easily deals with any shape, and the wires can be freely formed into an arbitrary shape. Further, the above process is divided into the process of forming the lead wires and the neutral wires with the use of NC forming, and the process of forming the plurality of segment coils by the die, thereby being capable of enhancing the productivity. Also, the coils having the stable shape can be manufactured with a reduction in the die.

(5) All of bend radii of the bends have the same dimension whereby the bending process can be sequentially conducted with the same molding pin, and the setup of the pin exchange can be omitted with the results that the productivity can be improved. Also, the bends have the same bend whereby the enamel coat of the coil can be evenly damaged, and the coil excellent in the insulation is obtained.

(6) Further, the insulation coat 600 is formed on the wire area where the straights and the bends are formed, thereby obtaining the sufficient withstand voltage in cooperation with the insulation coat of the wire.

(7) Also, the stator coil 138 has a coil structure in which the lead wire and the neutral wire are led from an innermost peripheral side or an outermost peripheral side of the slots. With this configuration, the lead wires and the neutral wires can be easily routed, and the lengths thereof can be suppressed. Also, the coil end 140a and the core back 440 can be reduced. This embodiment provides the coil structure in which the lead wires 41U, 41V1, and 41W are aligned perpendicularly to the axial direction and in parallel to each other, and the neutral wires 711 and 712 are arranged in opposite directions outwardly in the circumferential direction of the lead wires 41U, 41V1, and 41W (refer to FIG. 6). With the above structure, the lead wires and the neutral wires are led from the innermost peripheral side or the outermost peripheral side of the slots. Also, the convex area of the routing is narrowed to ensure the gap between the convex area and the mission portion. Also, a simple structure in which the securement of insulation between the wires, and the workability in manufacturing are taken into account while the lead wires are concentrated on one place is provided.

The above description is exemplary, and the interpretation of the present invention is not limited and detained by correspondence relationships between the description of the above embodiments and the definitions of the claims. The other examples without departing from the technical concept of the present invention are included in the present invention. For example, in the above-mentioned embodiments, the rotating electric machine having the permanent magnet in the rotor has been exemplified. Likewise, the present invention can be applied to the stator of the rotating electric machine such as an induction motor. Also, the present invention can be applied to a device other than the rotating electric machine for driving the vehicle.

The disclosure of the following basic priority application is incorporated herein by reference in its entirety.
Japanese Patent Application No. 2011-207403 (filed on Sep. 22, 2011).

The invention claimed is:

1. A stator for a rotating electric machine comprising:
a stator core having a plurality of slots aligned along a circumferential direction; and
a stator coil with an insulation coat inserted into the slots of the stator core;
wherein the stator coil includes:
main coils of a plurality of phases in which a plurality of segment coils each having a rectangular cross-section wire formed into a substantially U-shaped wire is connected to each other;
first sub-coils each having a first lead wire led from the slots and attached with an AC terminal, and connected to one end of the respective main coils; and
second sub-coils each having a second lead wire led from slots different from those of the first lead wire, and connected to the other end of the respective main coils, wherein
the first and second lead wires are each formed of a wire with a bend structure having a plurality of straights and bends,
the bends of the first and second lead wires extend in different directions from each other above a coil end of the stator coil, and
lead wires attached with the AC terminal are parallel.

2. The stator for the rotating electric machine according to claim 1,
wherein at least one of the lead wires includes a first wire area led from the slots and arriving at a head of the segment coils, a terminal connection area attached with the AC terminal disposed on a leading portion of the at least one of the lead wires, and a coil end route area between the terminal connection area and the first wire area; and
wherein two or more of the bends are formed in the wire of the coil end route area.

3. The stator for the rotating electric machine according to claim 1,
wherein the bends are formed by a forming process for bending the wire while abutting a molding pin against the wire, and an impression by the molding pin is formed on the bends.

4. The stator for the rotating electric machine according to claim 3,
wherein all bend radii of the bends have the same dimension.

5. The stator for the rotating electric machine according to claim 1, wherein an enamel coating is formed on a wire area where the straights and the bends are formed.

6. The stator for the rotating electric machine according to claim 1,
wherein the stator coil includes a coil structure in which the first lead wire and the second lead wire are led from an innermost peripheral side or an outermost peripheral side of the slots.

7. A rotating electric machine comprising:
the stator according to claim 1; and
a rotor rotatably arranged over the stator core through a given gap.

8. The stator for the rotating electric machine according to claim 1, wherein the AC terminal includes a portion stored in the slots of the stator core, a lead wire that leads from the slots, and a sub-coil is stored in a layer on an innermost peripheral side of the slots.

* * * * *